US012633270B2

(12) United States Patent     (10) Patent No.:   US 12,633,270 B2

Fujikawa                 (45) Date of Patent:     May 19, 2026

(54) ELECTRO-OPTICAL DEVICE AND ELECTRONIC EQUIPMENT CAPABLE OF REDUCING DELAY OF VIDEO SIGNALS

(71) Applicant: SEIKO EPSON CORPORATION, Tokyo (JP)

(72) Inventor: Shinsuke Fujikawa, Chino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 19/000,526

(22) Filed: Dec. 23, 2024

(65) Prior Publication Data

US 2025/0210006 A1     Jun. 26, 2025

(30) Foreign Application Priority Data

Dec. 25, 2023    (JP) ................................. 2023-217746

(51) Int. Cl.
   *G09G 3/36*       (2006.01)
   *G09G 3/00*       (2006.01)
   *H04N 9/31*       (2006.01)

(52) U.S. Cl.
   CPC ........... *G09G 3/3688* (2013.01); *G09G 3/006* (2013.01); *G09G 2300/0426* (2013.01); *G09G 2310/0248* (2013.01); *G09G 2310/0289* (2013.01); *G09G 2320/0252* (2013.01); *H04N 9/317* (2013.01)

(58) Field of Classification Search
   CPC ...... G09G 3/36; G09G 3/3611; G09G 3/3614; G09G 3/3622; G09G 3/3625; G09G 3/364; G09G 3/3644; G09G 3/3648; G09G 3/3666; G09G 3/3674; G09G 3/3677; G09G 3/3681; G09G 3/3685; G09G 3/3688; G09G 3/3692
   USPC .................................................... 345/87–104
   See application file for complete search history.

(56) References Cited

U.S. PATENT DOCUMENTS 11,528,814 B2 * 12/2022 Fujikawa ............... H05K 3/323
11,624,957 B2 * 4/2023 Fujikawa ............... H05K 1/147
                                    349/150
2005/0162605 A1   7/2005   Murade
2015/0356937 A1 * 12/2015 Fujikawa ............ G02F 1/13452
                                     345/87

(Continued)

FOREIGN PATENT DOCUMENTS

JP         H103096       1/1998
JP       H10133220      5/1998

(Continued)

*Primary Examiner* — Ke Xiao
*Assistant Examiner* — Nelson Lam
(74) *Attorney, Agent, or Firm* — JCIPRNET

(57) ABSTRACT

An electro-optical device includes a plurality of video signal lines and a plurality of pull-in video signal lines traversing a data line drive circuit. The pull-in video signal line includes a first pull-in video signal line having a shortest first wiring length and a second pull-in video signal line having a longest second wiring length. The video signal line includes a first video signal line electrically coupled to the first pull-in video signal line and a second video signal line electrically coupled to the second pull-in video signal line. A length from a first coupling point to one end of the first video signal line is a third wiring length. A length from the first coupling point to the other end of the first video signal line is a fourth wiring length.

5 Claims, 15 Drawing Sheets

(56)                References Cited

U.S. PATENT DOCUMENTS

2016/0147121 A1      5/2016  Nakajima
2018/0033386 A1 *   2/2018  Enami ................. G02F 1/13452
2024/0402532 A1 *   12/2024  Fujikawa ............ G02F 1/13439

FOREIGN PATENT DOCUMENTS

JP          2011191772       9/2011
JP          2016099492       5/2016

* cited by examiner

ELECTRO-OPTICAL DEVICE AND ELECTRONIC EQUIPMENT CAPABLE OF REDUCING DELAY OF VIDEO SIGNALS

The present application is based on, and claims priority from JP Application Serial Number 2023-217746, filed Dec. 25, 2023, the disclosure of which is hereby incorporated by reference herein in its entirety.

BACKGROUND

1. Technical Field

The present disclosure relates to an electro-optical device and electronic equipment.

2. Related Art

There is a phase development drive system known as one of drive systems for achieving high-speed drive of a liquid crystal panel. JP-A-2016-99492 discloses a liquid crystal panel driven by a phase development drive system. The phase development drive system may be called a block sequential drive system.

In the liquid crystal panel disclosed in JP-A-2016-99492, a video signal line group extending from a video signal terminal group is arranged at an element substrate so as to avoid a data line drive circuit. According to such a wiring layout, a propagation path of the video signal in the liquid crystal panel becomes long, and thus, a delay of the video signal occurs. Delay of the video signal hinders high-speed drive of the liquid crystal panel.

SUMMARY

An electro-optical device of one aspect of the present disclosure includes a plurality of scanning lines extending along a first direction, a plurality of data lines extending along a second direction intersecting the first direction, a pixel arranged corresponding to each position where the plurality of scanning lines and the plurality of data lines intersect with each other in a display region, a data line drive circuit arranged at a position away from the display region on one end side in the second direction, a plurality of video signal lines arranged between the display region and the data line drive circuit and extending along the first direction, and a plurality of pull-in video signal lines extending along the second direction and electrically coupled to the plurality of video signal lines on a one-to-one basis, in which in plan view, the plurality of pull-in video signal lines traverse the data line drive circuit, and the plurality of pull-in video signal lines include a first pull-in video signal line having a shortest first wiring length and a second pull-in video signal line having a longest second wiring length, the plurality of video signal lines include a first video signal line electrically coupled to the first pull-in video signal line at a first coupling point and a second video signal line electrically coupled to the second pull-in video signal line at a second coupling point, a length from the first coupling point to one end of the first video signal line is a third wiring length, a length from the first coupling point to the other end of the first video signal line is a fourth wiring length, a length from the second coupling point to one end of the second video signal line is a fifth wiring length, a length from the second coupling point to the other end of the second video signal line is a sixth wiring length, and a longest wiring length of the fifth wiring length and the sixth wiring length is shorter than a longest wiring length of the third wiring length and the fourth wiring length.

An electronic equipment of one aspect of the present disclosure includes the electro-optical device of the aspect described above.

DESCRIPTION OF EMBODIMENTS

Figure 1:
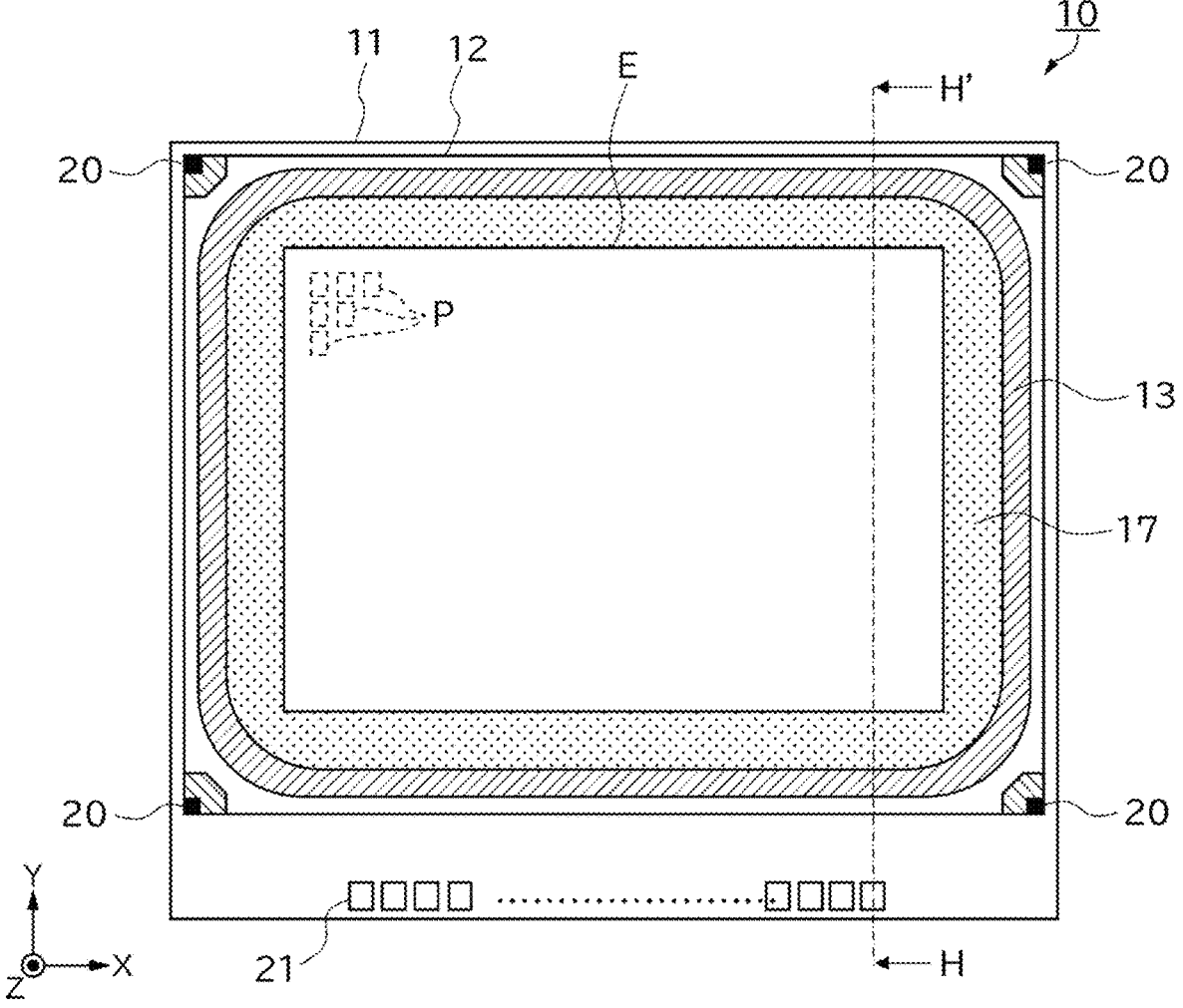
FIG. 1 is a plan view illustrating a schematic configuration of a liquid crystal panel in the present embodiment.

Embodiments of the present disclosure will be described below with reference to the drawings. Here, in the following drawings, in order to make the members, the wirings, the circuits, and the like recognizable, these scales may be different from the actual scales. In the following drawings, XYZ axes are given as coordinate axes orthogonal to one another as necessary, and in the drawings, a direction indicated by each arrow along the axis is a +direction, and a direction opposite to the +direction is a −direction.

1. Electro-Optical Device

Figure 2:
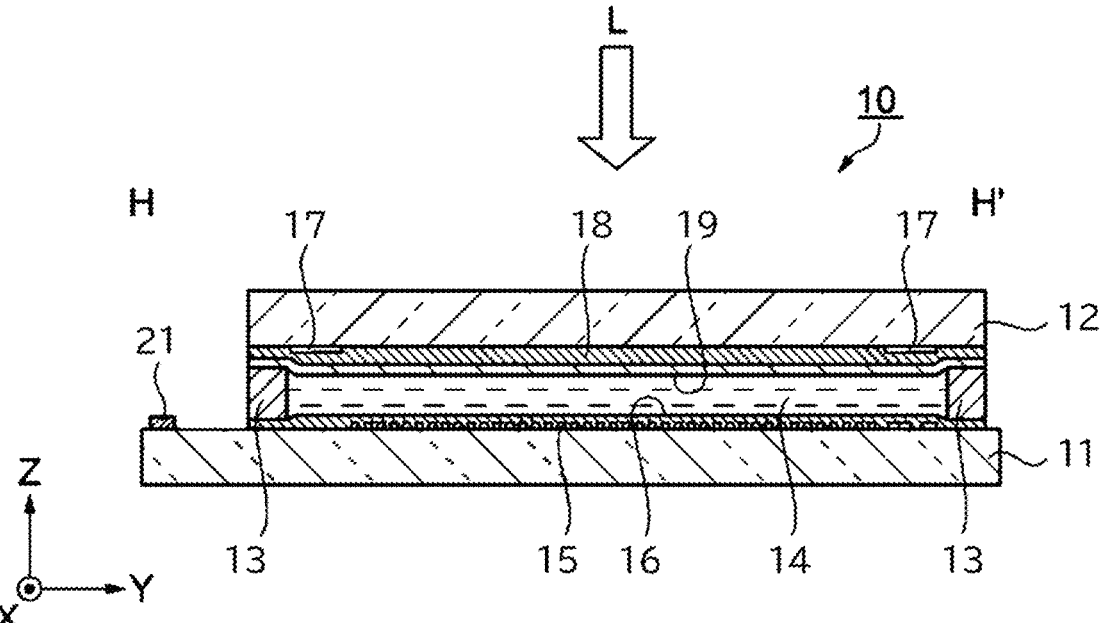
FIG. 2 is a cross-sectional view taken along line H-H' of FIG. 1.

First, a schematic configuration of a liquid crystal panel 10 in the present embodiment will be described with reference to FIGS. 1 and 2. The liquid crystal panel 10 is an example of the electro-optical device. FIG. 1 is a plan view illustrating a schematic configuration of the liquid crystal panel 10. FIG. 2 is a cross-sectional view taken along line H-H' of FIG. 1. In the following description, "plan view" is to view the liquid crystal panel 10 from the +Z direction.

For example, the liquid crystal panel 10 is an active driven type liquid crystal panel including a pixel switching element such as a thin film transistor (TFT) for each pixel P. The liquid crystal panel 10 is driven by a phase development drive system. Such the liquid crystal panel 10 can be suitably used as an optical modulation device in electronic equipment such as a projector.

The liquid crystal panel 10 includes an element substrate 11, a counter substrate 12, a sealing material 13, and a liquid crystal layer 14. The element substrate 11 and the counter substrate 12 each have a rectangular shape in plan view. The element substrate 11 and the counter substrate 12 are bonded to each other so as to face each other via the sealing material 13. The sealing material 13 is provided in a frame shape along an outer edge of the counter substrate 12. The sealing material 13 is an adhesive made of a photocurable resin, a thermosetting resin, or the like, and includes a gap material such as glass fiber or glass beads for giving a gap between the element substrate 11 and the counter substrate 12 a predetermined value.

The liquid crystal layer 14 is arranged in a region sandwiched between the element substrate 11 and the counter substrate 12 and surrounded by the sealing material 13. The liquid crystal layer 14 is made of, for example, liquid crystal having negative dielectric anisotropy. For example, the liquid crystal layer 14 is formed by a liquid crystal dropping method of dropping liquid crystal. That is, the liquid crystal panel 10 of the present embodiment does not have a liquid crystal sealing port for sealing liquid crystal. In the region surrounded by the sealing material 13, a display region E having a rectangular shape in plan view is arranged. The display region E includes a plurality of the pixels P arranged in a matrix.

The element substrate 11 includes a pixel electrode 15 having light permeability provided for each pixel P, a pixel switching element (not illustrated) arranged corresponding to the pixel electrode 15, and a first alignment film 16 arranged to cover the pixel electrode 15. The counter substrate 12 includes a parting portion 17, a common electrode 18, and a second alignment film 19 arranged to cover common electrode 18.

The pixel electrode 15 and the common electrode 18 are made of a transparent conductive material such as indium tin oxide (ITO). Each of the element substrate 11 and the counter substrate 12 is a substrate having translucency, and for example, a glass substrate or a quartz substrate is used. The first alignment film 16 and the second alignment film 19 are formed of an inorganic material such as silicon oxide.

The parting portion 17 indicated by halftone dots in FIG. 1 is a light shielding film formed so as to surround the display region E in plan view. Although not illustrated in FIGS. 1 and 2, the element substrate 11 includes a peripheral circuit arranged in a region between the display region E and the sealing material 13. That is, the parting portion 17 is arranged so as to overlap the peripheral circuit in plan view, and prevents the peripheral circuit from being irradiated with light L incident on the counter substrate 12 from the outside of the liquid crystal panel 10. This can prevent the peripheral circuit from malfunctioning due to the light L.

Corresponding to the four corners of the counter substrate 12, four inter-substrate conductive portions 20 for achieving electrical conduction between the element substrate 11 and the counter substrate 12 are arranged. The four inter-substrate conductive portions 20 are electrically coupled to the common electrode 18 arranged at the counter substrate 12. A plurality of external coupling terminals 21 are arranged at regular intervals along the X axis on a surface of a portion protruding in the −Y direction from the counter substrate 12 among portions of the element substrate 11. As described later, two of the plurality of external coupling terminals 21 are electrically coupled to the common electrode 18 via the inter-substrate conductive portion 20.

That is the explanation of the schematic configuration of the liquid crystal panel 10. Hereinafter, the circuit configuration of the element substrate 11 will be described in detail with reference to FIGS. 3 and 4. In the following description, the +X direction may be called left or left side, and the −X direction may be called right or right side. The +Y direction may be called down or lower side, and the −Y direction may be called up or upper side. The X axis is an example of an axis along the first direction. The Y axis is an example of an axis along the second direction intersecting the first direction. The upper side is an example of one end side in the axis along the second direction.

Figure 3:
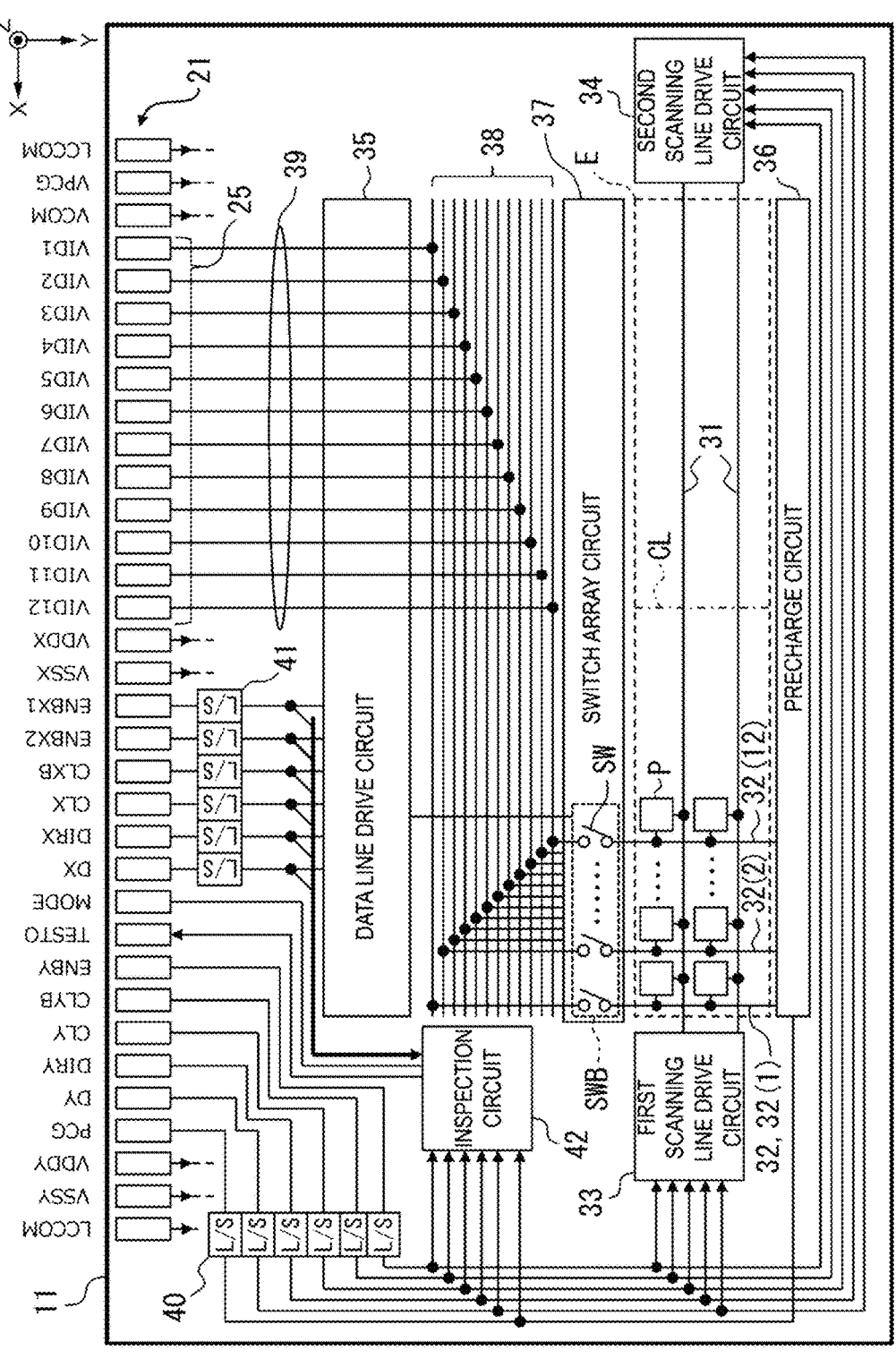
FIG. 3 is a plan view illustrating a circuit configuration of an element substrate.
Figure 4:
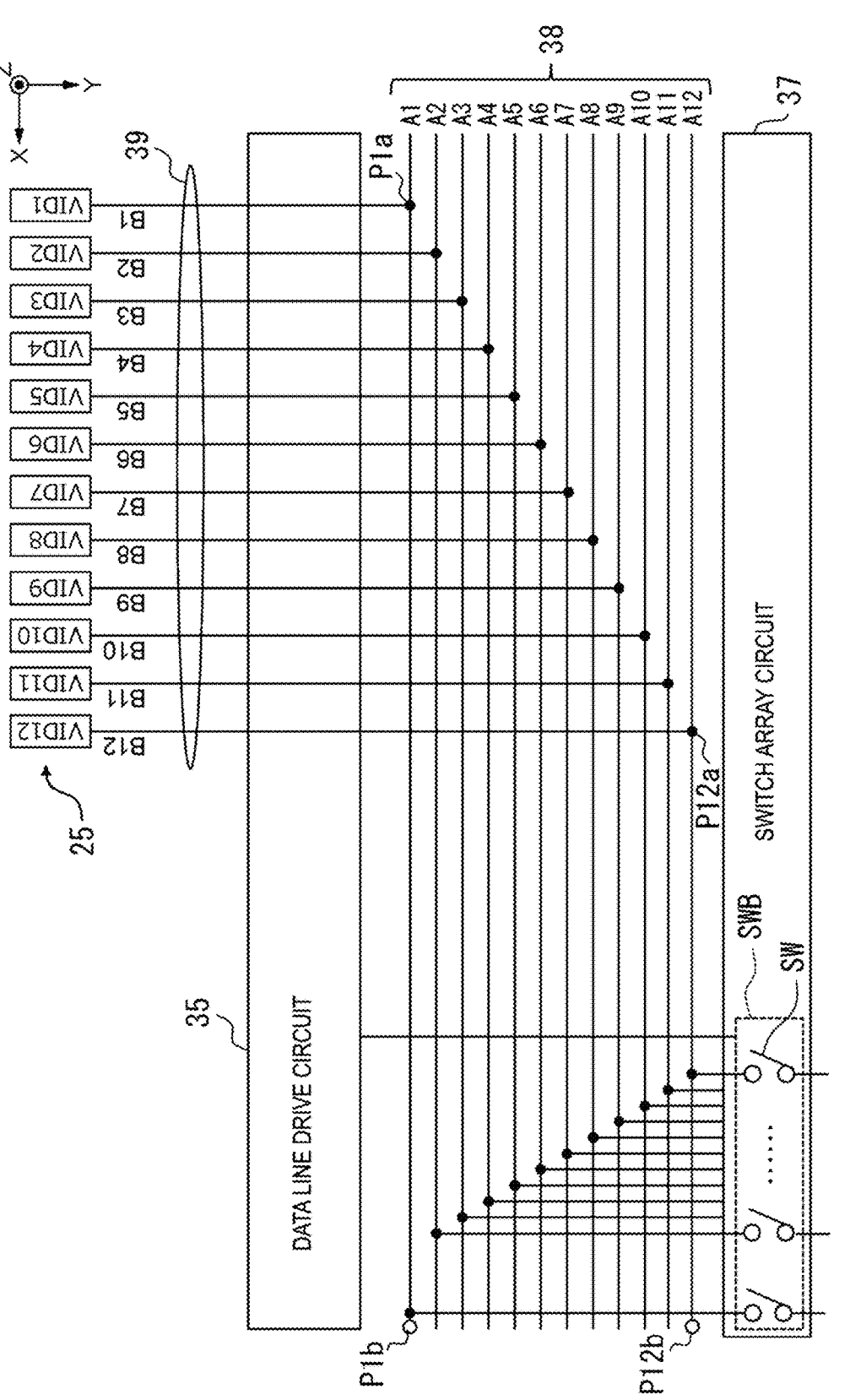
FIG. 4 is an enlarged view of a part of FIG. 3.

FIG. 3 is a plan view illustrating the circuit configuration of the element substrate 11. FIG. 4 is an enlarged view of a part of FIG. 3. As illustrated in FIG. 3, the element substrate 11 includes a plurality of scanning lines 31, a plurality of data lines 32, a first scanning line drive circuit 33, a second scanning line drive circuit 34, a data line drive circuit 35, a precharge circuit 36, a switch array circuit 37, a video signal line group 38, a pull-in video signal line group 39, a first level shifter group 40, a second level shifter group 41, and an inspection circuit 42.

In FIG. 3, a signal and a potential to be input to the external coupling terminal 21 from a control device (not illustrated) that controls the liquid crystal panel 10 and a signal to be output to the control device from the external coupling terminal 21 are indicated by alphabetic symbols.

For example, a first common potential LCCOM to be supplied to the common electrode 18 is input to the external coupling terminal 21 located on the leftmost side and the external coupling terminal 21 located on the rightmost side among the plurality of external coupling terminals 21. In the following description, the external coupling terminal 21 to which the first common potential LCCOM is input from the control device is called an "LCCOM terminal". Although not illustrated in FIG. 3, these two LCCOM terminals are electrically coupled to the common electrode 18 via the four inter-substrate conductive portions 20.

A first low potential VSSY to be supplied to the first scanning line drive circuit 33 and the second scanning line drive circuit 34 is input to the external coupling terminal 21 second from the left among the plurality of external coupling terminals 21. In the following description, the external coupling terminal 21 to which the first low potential VSSY is input from the control device is called a "VSSY terminal".

A first high potential VDDY to be supplied to the first scanning line drive circuit 33 and the second scanning line drive circuit 34 is input to the external coupling terminal 21 third from the left among the plurality of external coupling terminals 21. The first high potential VDDY is a potential higher than the first low potential VSSY. In the following description, the external coupling terminal 21 to which the first high potential VDDY is input from the control device is called a "VDDY terminal".

A precharge control signal PCG to be supplied to the precharge circuit 36 is input to the external coupling terminal 21 fourth from the left among the plurality of external coupling terminals 21. In the following description, the external coupling terminal 21 to which the precharge control signal PCG is input from the control device is called a "PCG terminal".

A first start pulse signal DY to be supplied to the first scanning line drive circuit 33 and the second scanning line drive circuit 34 is input to the external coupling terminal 21 fifth from the left among the plurality of external coupling terminals 21. In the following description, the external coupling terminal 21 to which the first start pulse signal DY is input from the control device is called a "DY terminal".

A first shift control signal DIRY to be supplied to the first scanning line drive circuit 33 and the second scanning line drive circuit 34 is input to the external coupling terminal 21 sixth from the left among the plurality of external coupling terminals 21. In the following description, the external coupling terminal 21 to which the first shift control signal DIRY is input from the control device is called a "DIRY terminal".

A first clock signal CLY to be supplied to the first scanning line drive circuit 33 and the second scanning line drive circuit 34 is input to the external coupling terminal 21 seventh from the left among the plurality of external coupling terminals 21. In the following description, the external coupling terminal 21 to which the first clock signal CLY is input from the control device is called a "CLY terminal".

A first inverted clock signal CLYB to be supplied to the first scanning line drive circuit 33 and the second scanning line drive circuit 34 is input to the external coupling terminal 21 eighth from the left among the plurality of external coupling terminals 21. The first inverted clock signal CLYB is an inverted signal of the first clock signal CLY. In the following description, the external coupling terminal 21 to which the first inverted clock signal CLYB is input from the control device is called a "CLYB terminal".

An enable signal ENBY to be supplied to the first scanning line drive circuit 33 and the second scanning line drive circuit 34 is input to the external coupling terminal 21 ninth from the left among the plurality of external coupling terminals 21. In the following description, the external coupling terminal 21 to which the enable signal ENBY is input from the control device is called an "ENBY terminal".

The external coupling terminal 21 tenth from the left among the plurality of external coupling terminals 21 is an output terminal that outputs an inspection result signal TESTO. The inspection result signal TESTO is a signal to be output from the inspection circuit 42 described later. The inspection result signal TESTO is a signal for determining an operation abnormality of, for example, the first level shifter group 40 and the second level shifter group 41. In the following description, the external coupling terminal 21 that outputs the inspection result signal TESTO is called a "TESTO terminal".

A mode switching signal MODE to be supplied to the inspection circuit 42 is input to the external coupling terminal 21 eleventh from the left among the plurality of external coupling terminals 21. The mode switching signal MODE is a signal for switching an inspection target, for example, and selects the first level shifter group 40 or the second level shifter group 41 as an abnormality determination target. In the following description, the external coupling terminal 21 to which the mode switching signal MODE is input is called a "MODE terminal".

A second start pulse signal DX to be supplied to the data line drive circuit 35 is input to the external coupling terminal 21 twelfth from the left among the plurality of external coupling terminals 21. In the following description, the external coupling terminal 21 to which the second start pulse signal DX is input from the control device is called a "DX terminal".

A second shift control signal DIRX to be supplied to the data line drive circuit 35 is input to the external coupling terminal 21 thirteenth from the left among the plurality of external coupling terminals 21. In the following description, the external coupling terminal 21 to which the second shift control signal DIRX is input from the control device is called a "DIRX terminal".

A second clock signal CLX to be supplied to the data line drive circuit 35 is input to the external coupling terminal 21 fourteenth from the left among the plurality of external coupling terminals 21. In the following description, the external coupling terminal 21 to which the second clock signal CLX is input from the control device is called a "CLX terminal".

A second inverted clock signal CLXB to be supplied to the data line drive circuit 35 is input to the external coupling terminal 21 fifteenth from the left among the plurality of external coupling terminals 21. The second inverted clock signal CLXB is an inverted signal of the second clock signal CLX. In the following description, the external coupling terminal 21 to which the second inverted clock signal CLXB is input from the control device is called a "CLXB terminal".

A second enable signal ENBX2 to be supplied to the data line drive circuit 35 is input to the external coupling terminal 21 sixteenth from the left among the plurality of external coupling terminals 21. In the following description, the external coupling terminal 21 to which the second enable signal ENBX2 is input from the control device is called an "ENBX2 terminal".

A first enable signal ENBX1 to be supplied to the data line drive circuit 35 is input to the external coupling terminal 21 seventeenth from the left among the plurality of external coupling terminals 21. In the following description, the external coupling terminal 21 to which the first enable signal ENBX1 is input from the control device is called an "ENBX1 terminal".

A second low potential VSSX to be supplied to the data line drive circuit 35 is input to the external coupling terminal 21 eighteenth from the left among the plurality of external coupling terminals 21. In the following description, the external coupling terminal 21 to which the second low potential VSSX is input from the control device is called a "VSSX terminal".

A second high potential VDDX to be supplied to the data line drive circuit 35 is input to the external coupling terminal 21 nineteenth from the left among the plurality of external coupling terminals 21. The second high potential VDDX is a potential higher than the second low potential VSSX. In the following description, the external coupling terminal 21 to which the second high potential VDDX is input from the control device is called a "VDDX terminal".

A precharge potential VPCG to be supplied to the precharge circuit 36 is input to the external coupling terminal 21 second from the right among the plurality of external coupling terminals 21. In the following description, the external coupling terminal 21 to which the precharge potential VPCG is input from the control device is called a "VPCG terminal".

A second common potential VCOM to be supplied to an electrode at one end of an auxiliary capacitor of each pixel P is input to the external coupling terminal 21 third from the right among the plurality of external coupling terminals 21. The second common potential VCOM may be the same potential as the first common potential LCCOM or may be a potential different from the first common potential LCCOM. In the following description, the external coupling terminal 21 to which the second common potential VCOM is input from the control device is called a "VCOM terminal". The VCOM terminal is electrically coupled to an electrode at one end of the auxiliary capacitor of each pixel P via a wiring (not illustrated).

A video signal VID1 of a first phase is input to the external coupling terminal 21 fourth from the right among the plurality of external coupling terminals 21. In the following description, the external coupling terminal 21 to which the video signal VID1 is input from the control device is called a "VID1 terminal".

A video signal VID2 of a second phase is input to the external coupling terminal 21 fifth from the right among the plurality of external coupling terminals 21. In the following description, the external coupling terminal 21 to which the video signal VID2 is input from the control device is called a "VID2 terminal".

A video signal VID3 of a third phase is input to the external coupling terminal 21 sixth from the right among the plurality of external coupling terminals 21. In the following description, the external coupling terminal 21 to which the video signal VID3 is input from the control device is called a "VID3 terminal".

A video signal VID4 of a fourth phase is input to the external coupling terminal 21 seventh from the right among the plurality of external coupling terminals 21. In the following description, the external coupling terminal 21 to which the video signal VID4 is input from the control device is called a "VID4 terminal".

A video signal VID5 of a fifth phase is input to the external coupling terminal 21 eighth from the right among the plurality of external coupling terminals 21. In the following description, the external coupling terminal 21 to which the video signal VID5 is input from the control device is called a "VID5 terminal".

A video signal VID6 of a sixth phase is input to the external coupling terminal 21 ninth from the right among the plurality of external coupling terminals 21. In the following description, the external coupling terminal 21 to which the video signal VID6 is input from the control device is called a "VID6 terminal".

A video signal VID7 of a seventh phase is input to the external coupling terminal 21 tenth from the right among the plurality of external coupling terminals 21. In the following description, the external coupling terminal 21 to which the video signal VID7 is input from the control device is called a "VID7 terminal".

A video signal VID8 of an eighth phase is input to the external coupling terminal 21 eleventh from the right among the plurality of external coupling terminals 21. In the following description, the external coupling terminal 21 to which the video signal VID8 is input from the control device is called a "VID8 terminal".

A video signal VID9 of a ninth phase is input to the external coupling terminal 21 twelfth from the right among the plurality of external coupling terminals 21. In the following description, the external coupling terminal 21 to which the video signal VID9 is input from the control device is called a "VID9 terminal".

A video signal VID10 of a tenth phase is input to the external coupling terminal 21 thirteenth from the right among the plurality of external coupling terminals 21. In the following description, the external coupling terminal 21 to which the video signal VID10 is input from the control device is called a "VID10 terminal".

A video signal VID11 of an eleventh phase is input to the external coupling terminal 21 fourteenth from the right among the plurality of external coupling terminals 21. In the following description, the external coupling terminal 21 to which the video signal VID11 is input from the control device is called a "VID11 terminal".

A video signal VID12 of a twelfth phase is input to the external coupling terminal 21 fifteenth from the right among the plurality of external coupling terminals 21. In the following description, the external coupling terminal 21 to which the video signal VID12 is input from the control device is called a "VID12 terminal".

As described above, the liquid crystal panel 10 of the present embodiment is driven by the phase development drive system of the twelve phases. In the following description, a terminal group including the twelve external coupling terminals 21 from the VID1 terminal to the VID12 terminal is called a "video signal terminal group 25". The center of the video signal terminal group 25 is at a position offset rightward from a display center line CL. For the sake of description, it is assumed that the VID12 terminal of the video signal terminal group 25 is near on the display center line CL. A modification of this offset amount will be described later. The display center line CL is a line passing through the center of the display region E and extending along the Y axis. The liquid crystal panel 10 of the present embodiment is a twelve-phase development drive system for ease of description. The actual liquid crystal panel 10 is, for example, a phase development drive system of 48 phases, and the video signal terminal group 25 includes 48 external coupling terminals 21. The control circuit of the liquid crystal panel 10 is an integrated circuit having a one-chip configuration, for example, and supplies the liquid crystal panel 10 with the video signals VID1 to VID12 and various drive signals. The video signals VID1 to VID12 are analog voltage signals, and the other drive signals are digital signals. In an integrated circuit that is a control circuit of the liquid crystal panel 10, an analog signal generation unit and a digital signal generation unit are often separately arranged in view of noise countermeasures and layout efficiency. As a result, the output terminals of the video signals VID1 to VID12 in the integrated circuit are arranged in a lump, and as a result, the video signal terminal group 25 in the liquid crystal panel 10 is arranged offset to one side with respect to the display center line CL.

The plurality of scanning lines 31 extend along the X axis and traverse the display region E along the X axis. The plurality of scanning lines 31 are arranged at regular intervals along the Y axis. The plurality of data lines 32 extend along the Y axis and traverse the display region E along the Y axis. The plurality of data lines 32 are arranged at regular intervals along the X axis. In the display region E, the pixels P are arranged corresponding to the respective positions where the plurality of scanning lines 31 and the plurality of data lines 32 intersect with one another.

Although not illustrated in FIG. 3, a gate of the pixel switching element arranged in the pixel P is electrically coupled to the scanning line 31 corresponding to the pixel P. A source of the pixel switching element arranged in the pixel P is electrically coupled to the data line 32 corresponding to the pixel P. A drain of the pixel switching element arranged in the pixel P is electrically coupled to the pixel electrode 15 arranged in the pixel P.

The first scanning line drive circuit 33 is arranged at the left side of the display region E and extends along the Y axis. The second scanning line drive circuit 34 is arranged at the right side of the display region E and extends along the Y axis. The first scanning line drive circuit 33 is electrically coupled to one end of each scanning line 31. The second scanning line drive circuit 34 is electrically coupled to the other end of each scanning line 31.

The first scanning line drive circuit 33 and the second scanning line drive circuit 34 are electrically coupled to each of the DY terminal, the DIRY terminal, the CLY terminal, the CLYB terminal, and the ENBY terminal via the first level shifter group 40. The first scanning line drive circuit 33 and the second scanning line drive circuit 34 are electrically coupled to each of the VDDY terminal and the VSSY terminal via wiring (not illustrated).

The first level shifter group 40 includes six level shifters indicated by symbols "L/S". The first start pulse signal DY to be input to the DY terminal, the first shift control signal DIRY to be input to the DIRY terminal, the first clock signal CLY to be input to the CLY terminal, the first inverted clock signal CLYB to be input to the CLYB terminal, and the enable signal ENBY to be input to the ENBY terminal are supplied to the first scanning line drive circuit 33 and the second scanning line drive circuit 34 via level shifters corresponding to the respective terminals. In the first level shifter group 40, there may be an example including a buffer circuit corresponding to a drive load of each signal line. In the case of a clock signal, there may be an example including a phase difference correction circuit. As described above, since the video signal terminal group 25 is arranged in an offset manner, the input signal terminal group to the first level shifter group 40 is arranged in an offset manner on the opposite side to the offset direction of the video signal terminal group 25 with respect to the display center line CL. This can make the outer dimension of the liquid crystal panel 10 compact.

The voltage levels of the first start pulse signal DY, the first shift control signal DIRY, the first clock signal CLY, the first inverted clock signal CLYB, and the enable signal ENBY are adjusted to values suitable for the first scanning line drive circuit 33 and the second scanning line drive circuit 34 by the level shifters corresponding to the DY terminal, the DIRY terminal, the CLY terminal, the CLYB terminal, and the ENBY terminal, respectively.

The first scanning line drive circuit 33 and the second scanning line drive circuit 34 are supplied with the first high potential VDDY and the first low potential VSSY via the VDDY terminal and the VSSY terminal. The first scanning line drive circuit 33 and the second scanning line drive circuit 34 use a potential difference between the first high potential VDDY and the first low potential VSSY as a power source voltage.

Although not illustrated in FIG. 3, the first scanning line drive circuit 33 and the second scanning line drive circuit 34 include a first shift register circuit, a first waveform shaping circuit, and a first buffer circuit. The first shift register circuit starts a transfer operation in synchronization with the first start pulse signal DY. The shift direction of the first shift register circuit is controlled by the first shift control signal DIRY. The first clock signal CLY and the first inverted clock signal CLYB are used as clock signals of the first shift register circuit.

The first shift register circuit includes a plurality of flip-flops corresponding to the plurality of scanning lines 31 on a one-to-one basis. The first waveform shaping circuit includes a plurality of AND circuits corresponding to the plurality of scanning lines 31 on a one-to-one basis. The enable signal ENBY is input to each AND circuit included in the first waveform shaping circuit. For example, the output signal of the flip-flop corresponding to the scanning line 31(i) is input to the AND circuit corresponding to the scanning line 31(i). The scanning line 31(i) means the scanning line 31 i-th from the bottom among the plurality of scanning lines 31. i is an integer from 1 to N. N is the total number of the scanning lines 31.

The AND circuit corresponding to the scanning line 31(i) outputs a signal indicating a logical product of the output signal of the flip-flop corresponding to the scanning line 31(i) and the enable signal ENBY as a scanning signal to be supplied to the scanning line 31(i). The scanning signal output from the AND circuit corresponding to the scanning line 31(i) is buffered by the first buffer circuit and then supplied to the scanning line 31(i).

The precharge circuit 36 is arranged below the display region E and extends along the X axis. The precharge circuit 36 is electrically coupled to one end of each data line 32. The precharge circuit 36 is electrically coupled to the PCG terminal via one level shifter included in the first level shifter group 40. The precharge circuit 36 is electrically coupled to the VPCG terminal via wiring (not illustrated).

The precharge control signal PCG to be input to the PCG terminal is supplied to the precharge circuit 36 via a level shifter corresponding to the PCG terminal. The voltage level of the precharge control signal PCG is adjusted to a value suitable for the precharge circuit 36 by the level shifter corresponding to the PCG terminal. The precharge circuit 36 is supplied with the precharge potential VPCG via the VPCG terminal.

Although not illustrated in FIG. 3, the precharge circuit 36 includes a plurality of switching elements corresponding to the plurality of data lines 32 on a one-to-one basis. Each switching element included in the precharge circuit 36 is controlled by the precharge control signal PCG. When each switching element included in the precharge circuit 36 is controlled to an on state by the precharge control signal PCG, each data line 32 is supplied with the precharge potential VPCG.

The switch array circuit 37 is arranged above the display region E and extends along the X axis. The video signal line group 38 is arranged above the switch array circuit 37 and extends along the X axis. The data line drive circuit 35 is arranged above the video signal line group 38, and extends along the X axis. In other words, the data line drive circuit 35 is arranged at a position apart upward from the display region E. This, these circuit elements are arranged in the order of the switch array circuit 37, the video signal line group 38, the data line drive circuit 35, and the video signal terminal group 25 from the display region E upward.

The video signal line group 38 is electrically coupled to the video signal terminal group 25 via the pull-in video signal line group 39. As illustrated in FIG. 4, the video signal line group 38 is arranged between the display region E and the data line drive circuit 35, and includes twelve video signal lines A1 to A12 extending along the X axis. More specifically, the video signal line group 38 is typically arranged between the switch array circuit 37 and the data line drive circuit 35. The video signal lines A1 to A12 are arranged at regular intervals along the Y axis. The video signal lines A1 to A12 typically extend corresponding to the width of the X direction of the display region E.

The pull-in video signal line group 39 includes twelve pull-in video signal lines B1 to B12 extending along the Y axis and electrically coupled to the twelve video signal lines A1 to A12 on a one-to-one basis. The pull-in video signal lines B1 to B12 are arranged, for example, at regular intervals along the X axis. In plan view, the pull-in video signal lines B1 to B12 traverse the data line drive circuit 35. That is, in the element substrate 11, at least the data line drive circuit 35 and the video signal line group 38 are formed at a layer different from the layer at which the pull-in video signal line group 39 is formed. For example, the wiring layer at which the pull-in video signal line group 39 is formed is mainly made of, for example, aluminum. The pull-in video signal lines B1 to B12 are arranged on a gate electrode, a source electrode, and a drain electrode of a transistor constituting the data line drive circuit 35, and on an insulating layer layered on a wiring layer constituting the video signal line group 38. Such a configuration enables the pull-in video signal lines B1 to B12 to traverse the data line drive circuit 35 in plan view.

Among the video signal lines A1 to A12, the video signal line A1 first from the top, that is, the video signal line A1 closest to the data line drive circuit 35 is electrically coupled to the VID1 terminal via the pull-in video signal line B1. The VID1 terminal is the video signal terminal located on the rightmost side among the video signal terminals included in the video signal terminal group 25. In other words, the VID1 terminal is a video signal terminal having the largest offset amount among the video signal terminals located at positions offset rightward from the display center line CL. The video signal VID1 to be input to the VID1 terminal is supplied to the video signal line A1 via the pull-in video signal line B1.

Among the video signal lines A1 to A12, the video signal line A2 second from the top is electrically coupled to the VID2 terminal via the pull-in video signal line B2. The VID2 terminal is the video signal terminal second from the right among the video signal terminals included in the video signal terminal group 25. The video signal VID2 to be input to the VID2 terminal is supplied to the video signal line A2 via the pull-in video signal line B2.

Among the video signal lines A1 to A12, the video signal line A3 third from the top is electrically coupled to the VID3 terminal via the pull-in video signal line B3. The VID3 terminal is the video signal terminal third from the right among the video signal terminals included in the video signal terminal group 25. The video signal VID3 to be input to the VID3 terminal is supplied to the video signal line A3 via the pull-in video signal line B3.

Among the video signal lines A1 to A12, the video signal line A4 fourth from the top is electrically coupled to the VID4 terminal via the pull-in video signal line B4. The VID4 terminal is the video signal terminal fourth from the right among the video signal terminals included in the video signal terminal group 25. The video signal VID4 to be input to the VID4 terminal is supplied to the video signal line A4 via the pull-in video signal line B4.

Among the video signal lines A1 to A12, the video signal line A5 fifth from the top is electrically coupled to the VID5 terminal via the pull-in video signal line B5. The VID5 terminal is the video signal terminal fifth from the right among the video signal terminals included in the video signal terminal group 25. The video signal VID5 to be input to the VID5 terminal is supplied to the video signal line A5 via the pull-in video signal line B5.

Among the video signal lines A1 to A12, the video signal line A6 sixth from the top is electrically coupled to the VID6 terminal via the pull-in video signal line B6. The VID6 terminal is the video signal terminal sixth from the right among the video signal terminals included in the video signal terminal group 25. The video signal VID6 to be input to the VID6 terminal is supplied to the video signal line A6 via the pull-in video signal line B6.

Among the video signal lines A1 to A12, the video signal line A7 seventh from the top is electrically coupled to the VID7 terminal via the pull-in video signal line B7. The VID7 terminal is the video signal terminal seventh from the right among the video signal terminals included in the video signal terminal group 25. The video signal VID7 to be input to the VID7 terminal is supplied to the video signal line A7 via the pull-in video signal line B7.

Among the video signal lines A1 to A12, the video signal line A8 eighth from the top is electrically coupled to the VID8 terminal via the pull-in video signal line B8. The VID8 terminal is the video signal terminal eighth from the right among the video signal terminals included in the video signal terminal group 25. The video signal VID8 to be input to the VID8 terminal is supplied to the video signal line A8 via the pull-in video signal line B8.

Among the video signal lines A1 to A12, the video signal line A9 ninth from the top is electrically coupled to the VID9 terminal via the pull-in video signal line B9. The VID9 terminal is a video signal terminal ninth from the right among the video signal terminals included in the video signal terminal group 25. The video signal VID9 to be input to the VID9 terminal is supplied to the video signal line A9 via the pull-in video signal line B9.

Among the video signal lines A1 to A12, the video signal line A10 tenth from the top is electrically coupled to the VID10 terminal via the pull-in video signal line B10. The VID10 terminal is the video signal terminal tenth from the right among the video signal terminals included in the video signal terminal group 25. The video signal VID10 to be input to the VID10 terminal is supplied to the video signal line A10 via the pull-in video signal line B10.

Among the video signal lines A1 to A12, the video signal line A11 eleventh from the top is electrically coupled to the VID11 terminal via the pull-in video signal line B11. The VID11 terminal is the video signal terminal eleventh from the right among the video signal terminals included in the video signal terminal group 25. The video signal VID11 to be input to the VID11 terminal is supplied to the video signal line A11 via the pull-in video signal line B11.

Among the video signal lines A1 to A12, the video signal line A12 twelfth from the top, that is, the video signal line A12 farthest from the data line drive circuit 35 is electrically coupled to the VID12 terminal via the pull-in video signal line B12. The VID12 terminal is the video signal terminal located on the leftmost side among the video signal terminals included in the video signal terminal group 25. The video signal VID12 to be input to the VID12 terminal is supplied to the video signal line A12 via the pull-in video signal line B12.

The switch array circuit 37 is electrically coupled to the other end of each data line 32. The switch array circuit 37 includes the plurality of switching elements SW corresponding to the plurality of data lines 32 on a one-to-one basis. For example, the switching element SW is a TFT. A CMOS configuration is often used for the purpose of supporting high-speed writing.

The data line 32(a) is electrically coupled to the video signal line A1 via the switching element SW corresponding to the data line 32(a). The data line 32(a) means the data line 32 a-th from the left among the plurality of data lines 32. a is expressed by the following Expression (1). In the following Expression (1), j is an integer from 0 to M. M is a value in which 1 is subtracted from a value in which the total number of the data lines 32 is divided by 12.

$$a = 12 \times j + 1 \tag{1}$$

For example, as understood by substituting 0 as the value of j into the above Expression (1), the data line 32(1) first from the left is electrically coupled to the video signal line A1 via the switching element SW corresponding to the data line 32(1). For example, as understood by substituting 1 as the value of j into the above Expression (1), the data line 32(13) thirteenth from the left is electrically coupled to the video signal line A1 via the switching element SW corresponding to the data line 32(13).

The data line 32(b) is electrically coupled to the video signal line A2 via the switching element SW corresponding to the data line 32 (b). The data line 32 (b) means the data line 32 b-th from the left among the plurality of data lines 32. b is expressed by the following Expression (2).

$$b = 12 \times j + 2 \tag{2}$$

For example, as understood by substituting 0 as the value of j into the above Expression (2), the data line 32(2) second from the left is electrically coupled to the video signal line A2 via the switching element SW corresponding to the data line 32(2). For example, as understood by substituting 1 as the value of j into the above Expression (2), the data line 32(14) fourteenth from the left is electrically coupled to the video signal line A2 via the switching element SW corresponding to the data line 32 (14).

The data line 32(c) is electrically coupled to the video signal line A3 via the switching element SW corresponding to the data line 32(c). The data line 32(c) means the data line 32 c-th from the left among the plurality of data lines 32. c is expressed by the following Expression (3).

$$c = 12 \times j + 3 \tag{3}$$

For example, as understood by substituting 0 as the value of j into the above Expression (3), the data line 32(3) third from the left is electrically coupled to the video signal line A3 via the switching element SW corresponding to the data line 32(3). For example, as understood by substituting 1 as the value of j into the above Expression (3), the data line 32(15) fifteenth from the left is electrically coupled to the video signal line A3 via the switching element SW corresponding to the data line 32(15).

The data line 32(d) is electrically coupled to the video signal line A4 via the switching element SW corresponding to the data line 32(d). The data line 32(d) means the data line 32 d-th from the left among the plurality of data lines 32. d is expressed by the following Expression (4).

$$d = 12 \times j + 4 \tag{4}$$

For example, as understood by substituting 0 as the value of j into the above Expression (4), the data line 32(4) fourth from the left is electrically coupled to the video signal line A4 via the switching element SW corresponding to the data line 32(4). For example, as understood by substituting 1 as the value of j into the above Expression (4), the data line 32(16) sixteenth from the left is electrically coupled to the video signal line A4 via the switching element SW corresponding to the data line 32(16).

The data line 32(e) is electrically coupled to the video signal line A5 via the switching element SW corresponding to the data line 32(e). The data line 32(e) means the data line 32 e-th from the left among the plurality of data lines 32. e is expressed by the following Expression (5).

$$e = 12 \times j + 5 \tag{5}$$

For example, as understood by substituting 0 as the value of j into the above Expression (5), the data line 32(5) fifth from the left is electrically coupled to the video signal line A5 via the switching element SW corresponding to the data line 32(5). For example, as understood by substituting 1 as the value of j into the above Expression (5), the data line 32(17) seventeenth from the left is electrically coupled to the video signal line A5 via the switching element SW corresponding to the data line 32(17).

The data line 32(f) is electrically coupled to the video signal line A6 via the switching element SW corresponding to the data line 32(f). The data line 32(f) means the data line 32 f-th from the left among the plurality of data lines 32. f is expressed by the following Expression (6).

$$f = 12 \times j + 6 \tag{6}$$

For example, as understood by substituting 0 as the value of j into the above Expression (6), the data line 32(6) sixth from the left is electrically coupled to the video signal line A6 via the switching element SW corresponding to the data line 32(6). For example, as understood by substituting 1 as the value of j into the above Expression (6), the data line 32(18) eighteenth from the left is electrically coupled to the video signal line A6 via the switching element SW corresponding to the data line 32(18).

The data line 32(g) is electrically coupled to the video signal line A7 via the switching element SW corresponding to the data line 32(g). The data line 32(g) means the data line 32 g-th from the left among the plurality of data lines 32. g is expressed by the following Expression (7).

$$g = 12 \times j + 7 \tag{7}$$

For example, as understood by substituting 0 as the value of j into the above Expression (7), the data line 32(7) seventh from the left is electrically coupled to the video signal line A7 via the switching element SW corresponding to the data line 32(7). For example, as understood by substituting 1 as the value of j into the above Expression (7), the data line 32(19) nineteenth from the left is electrically coupled to the video signal line A7 via the switching element SW corresponding to the data line 32(19).

The data line 32(h) is electrically coupled to the video signal line A8 via the switching element SW corresponding to the data line 32 (h). The data line 32 (h) means the data line 32 h-th from the left among the plurality of data lines 32. h is expressed by the following Expression (8).

$$h = 12 \times j + 8 \tag{8}$$

For example, as understood by substituting 0 as the value of j into the above Expression (8), the data line 32(8) eighth from the left is electrically coupled to the video signal line A8 via the switching element SW corresponding to the data line 32(8). For example, as understood by substituting 1 as the value of j into the above Expression (8), the data line 32(20) twentieth from the left is electrically coupled to the video signal line A8 via the switching element SW corresponding to the data line 32 (20).

The data line 32(k) is electrically coupled to the video signal line A9 via the switching element SW corresponding to the data line 32(k). The data line 32(k) means the data line 32 k-th from the left among the plurality of data lines 32. k is expressed by the following Expression (9).

$$k = 12 \times j + 9 \tag{9}$$

For example, as understood by substituting 0 as the value of j into the above Expression (9), the data line 32(9) ninth from the left is electrically coupled to the video signal line A9 via the switching element SW corresponding to the data line 32(9). For example, as understood by substituting 1 as the value of j into the above Expression (9), the data line 32(21) twenty-first from the left is electrically coupled to the video signal line A9 via the switching element SW corresponding to the data line 32 (21).

The data line 32(m) is electrically coupled to the video signal line A10 via the switching element SW corresponding to the data line 32 (m). The data line 32 (m) means the data line 32 m-th from the left among the plurality of data lines 32. m is expressed by the following Expression (10).

$$m = 12 \times j + 10 \tag{10}$$

For example, as understood by substituting 0 as the value of j into the above Expression (10), the data line 32(10) tenth from the left is electrically coupled to the video signal line A10 via the switching element SW corresponding to the data line 32 (10). For example, as understood by substituting 1 as the value of j into the above Expression (10), the data line 32(22) twenty-second from the left is electrically coupled to the video signal line A10 via the switching element SW corresponding to the data line 32(22).

The data line 32(n) is electrically coupled to the video signal line A11 via the switching element SW corresponding to the data line 32 (n). The data line 32 (n) means the data line 32 n-th from the left among the plurality of data lines 32. n is expressed by the following Expression (11).

$$n = 12 \times j + 11 \tag{11}$$

For example, as understood by substituting 0 as the value of j into the above Expression (11), the data line 32(11) eleventh from the left is electrically coupled to the video signal line A11 via the switching element SW corresponding to the data line 32(11). For example, as understood by substituting 1 as the value of j into the above Expression (11), the data line 32(23) twenty-third from the left is electrically coupled to the video signal line A11 via the switching element SW corresponding to the data line 32 (23).

The data line 32(p) is electrically coupled to the video signal line A12 via the switching element SW corresponding to the data line 32 (p). The data line 32 (p) means the data line 32 p-th from the left among the plurality of data lines 32. p is expressed by the following Expression (12).

$$p = 12 \times j + 12 \tag{12}$$

For example, as understood by substituting 0 as the value of j into the above Expression (12), the data line 32(12) twelfth from the left is electrically coupled to the video signal line A12 via the switching element SW corresponding to the data line 32(12). For example, as understood by substituting 1 as the value of j into the above Expression (12), the data line 32(24) twenty-fourth from the left is electrically coupled to the video signal line A12 via the switching element SW corresponding to the data line 32(24).

The switch array circuit 37 includes a plurality of switch blocks SWB. Each switch block SWB includes twelve switching elements SW. The switching elements SW included in the switch array circuit 37 are controlled in units of the switch blocks SWB by the data line drive circuit 35 described later.

The data line drive circuit 35 is electrically coupled to each of the DX terminal, the DIRX terminal, the CLX terminal, the CLXB terminal, the ENBX1 terminal, and the ENBX2 terminal via the second level shifter group 41. The data line drive circuit 35 is electrically coupled to each of the VDDX terminal and the VSSX terminal via wiring (not illustrated).

The second level shifter group 41 includes six level shifters indicated by symbols "L/S". The second start pulse signal DX to be input to the DX terminal, the second shift control signal DIRX to be input to the DIRX terminal, the second clock signal CLX to be input to the CLX terminal, the second inverted clock signal CLXB to be input to the CLXB terminal, the first enable signal ENBX1 to be input to the ENBX1 terminal, and the second enable signal ENBX2 to be input to the ENBX2 terminal are supplied to the data line drive circuit 35 via level shifters corresponding to the respective terminals. In the second level shifter group 41, there may be an example including a buffer circuit corresponding to a drive load of each signal line. In the case of a clock signal, there may be an example including a phase difference correction circuit. As described above, since the video signal terminal group 25 is arranged in an offset manner, the input signal terminal group to the second level shifter group 41 is arranged in an offset manner on the opposite side to the offset direction of the video signal terminal group 25 with respect to the display center line CL. This can make the outer dimension of the liquid crystal panel 10 compact.

The voltage levels of the second start pulse signal DX, the second shift control signal DIRX, the second clock signal CLX, the second inverted clock signal CLXB, the first enable signal ENBX1, and the second enable signal ENBX2 are adjusted to values suitable for the data line drive circuit 35 by the level shifters corresponding to the DX terminal, the DIRX terminal, the CLX terminal, the CLXB terminal, the ENBX1 terminal, and the ENBX2 terminal, respectively. Use of two systems of the first enable signal ENBX1 and the second enable signal ENBX2 can reliably shape a write selection period of about several 10n seconds, in other words, an on period of the switching element SW, and therefore high-speed writing can be supported.

The data line drive circuit 35 is supplied with the second high potential VDDX and the second low potential VSSX via the VDDX terminal and the VSSX terminal. The data line drive circuit 35 uses a potential difference between the second high potential VDDX and the second low potential VSSX as a power source voltage.

Although not illustrated in FIGS. 3 and 4, the data line drive circuit 35 includes a second shift register circuit, a second waveform shaping circuit, and a second buffer circuit. The second shift register circuit starts a transfer operation in synchronization with the second start pulse signal DX. The shift direction of the second shift register circuit is controlled by the second shift control signal DIRX. The second clock signal CLX and the second inverted clock signal CLXB are used as clock signals of the second shift register circuit.

The second shift register circuit includes a plurality of flip-flops corresponding to the plurality of switch blocks SWB on a one-to-one basis. The second waveform shaping circuit includes a plurality of AND circuits corresponding to the plurality of switch blocks SWB on a one-to-one basis. The first enable signal ENBX1 is input to the AND circuit corresponding to the switch block SWB odd-number-th from the left. The second enable signal ENBX2 is input to the AND circuit corresponding to the switch block SWB even-number-th from the left.

For example, the output signal of the flip-flop corresponding to the switch block SWB(r) is input to the AND circuit corresponding to the switch block SWB(r). The switch block SWB(r) means the switch block SWB r-th from the left among the plurality of switch blocks SWB(r). r is an integer from 1 to K. K is the total number of the switch blocks SWB.

The AND circuit corresponding to the switch block SWB (r) outputs a signal indicating a logical product of the output signal of the flip-flop corresponding to the switch block SWB(r) and the first enable signal ENBX1 or the second enable signal ENBX2 as a switch control signal to be supplied to the switch block SWB(r). The switch control signal output from the AND circuit corresponding to the switch block SWB(r) is buffered by the second buffer circuit and then supplied to the switch block SWB(r).

When the switch block SWB(r) is supplied with the switch control signal, all of the twelve switching elements SW included in the switch block SWB(r) are brought into the on state. For example, when the switch block SWB(1) first from the left is supplied with the switch control signal, the twelve switching elements SW corresponding to the twelve data lines 32 from the data line 32(1) to the data line 32(12) are brought into the on state.

In this case, for example, the video signal VID1 to be input to the VID1 terminal is supplied to the data line 32(1) via the pull-in video signal line B1 and the video signal line A1. In this case, for example, the video signal VID12 to be input to the VID12 terminal is supplied to the data line 32(12) via the pull-in video signal line B12 and the video signal line A12.

For example, when the switch block SWB(2) second from the left is supplied with the switch control signal, the twelve switching elements SW corresponding to the twelve data lines 32 from the data line 32(13) to the data line 32(24) are brought into the on state. In this case, for example, the video signal VID1 to be input to the VID1 terminal is supplied to the data line 32(13) via the pull-in video signal line B1 and the video signal line A1. In this case, for example, the video signal VID12 to be input to the VID12 terminal is supplied to the data line 32(24) via the pull-in video signal line B12 and the video signal line A12.

As understood from the above description, for example, when the scanning line 31($i$) is supplied with a scanning signal and the switch block SWB(1) is supplied with a switch control signal, the pixel switching element of the pixel P corresponding to the position where the scanning line 31($i$) and the data line 32(1) intersect is brought into the on state, and the liquid crystal layer 14 between the pixel electrode 15 of the pixel P and the common electrode 18 is applied with the potential difference between the video signal VID1 and the first common potential LCCOM. In this case, for example, the pixel switching element of the pixel P corresponding to the position where the scanning line 31($i$) and the data line 32(12) intersect is brought into the on state, and the liquid crystal layer 14 between the pixel electrode 15 of the pixel P and the common electrode 18 is applied with the potential difference between the video signal VID12 and the first common potential LCCOM.

For example, when the scanning line 31($i$) is supplied with a scanning signal and the switch block SWB(2) is supplied with a switch control signal, the pixel switching element of the pixel P corresponding to the position where the scanning line 31($i$) and the data line 32(13) intersect is brought into the on state, and the liquid crystal layer 14 between the pixel electrode 15 of the pixel P and the common electrode 18 is applied with the potential difference between the video signal VID1 and the first common potential LCCOM. In this case, for example, the pixel switching element of the pixel P corresponding to the position where the scanning line 31($i$) and the data line 32(24) intersect is brought into the on state, and the liquid crystal layer 14 between the pixel electrode 15 of the pixel P and the common electrode 18 is applied with the potential difference between the video signal VID12 and the first common potential LCCOM.

The inspection circuit 42 is electrically coupled to each of the PCG terminal, the DY terminal, the DIRY terminal, the CLY terminal, the CLYB terminal, and the ENBY terminal via the first level shifter group 40. The inspection circuit 42 is electrically coupled to each of the DX terminal, the DIRX terminal, the CLX terminal, the CLXB terminal, the ENBX1 terminal, and the ENBX2 terminal via the second level shifter group 41. Furthermore, the inspection circuit 42 is electrically coupled to the MODE terminal and the TESTO terminal.

The inspection circuit 42 is switched to any one inspection mode of a first inspection mode and a second inspection mode in response to the mode switching signal MODE input from an inspection device (not illustrated) via the MODE terminal.

When the inspection mode is the first inspection mode, the inspection circuit 42 inspects whether or not the first level shifter group 40 is normally operating based on the precharge control signal PCG, the first start pulse signal DY, the first shift control signal DIRY, the first clock signal CLY, the first inverted clock signal CLYB, and the enable signal ENBY.

When the inspection mode is the second inspection mode, the inspection circuit 42 inspects whether or not the second level shifter group 41 is normally operating based on the second start pulse signal DX, the second shift control signal DIRX, the second clock signal CLX, the second inverted clock signal CLXB, the first enable signal ENBX1, and the second enable signal ENBX2.

After inspecting the first level shifter group 40 or the second level shifter group 41, the inspection circuit 42 outputs the inspection result signal TESTO indicating an inspection result to the TESTO terminal. The inspection result signal TESTO to be output from the inspection circuit 42 to the TESTO terminal is output from the TESTO terminal to the inspection device (not illustrated).

Figure 5:
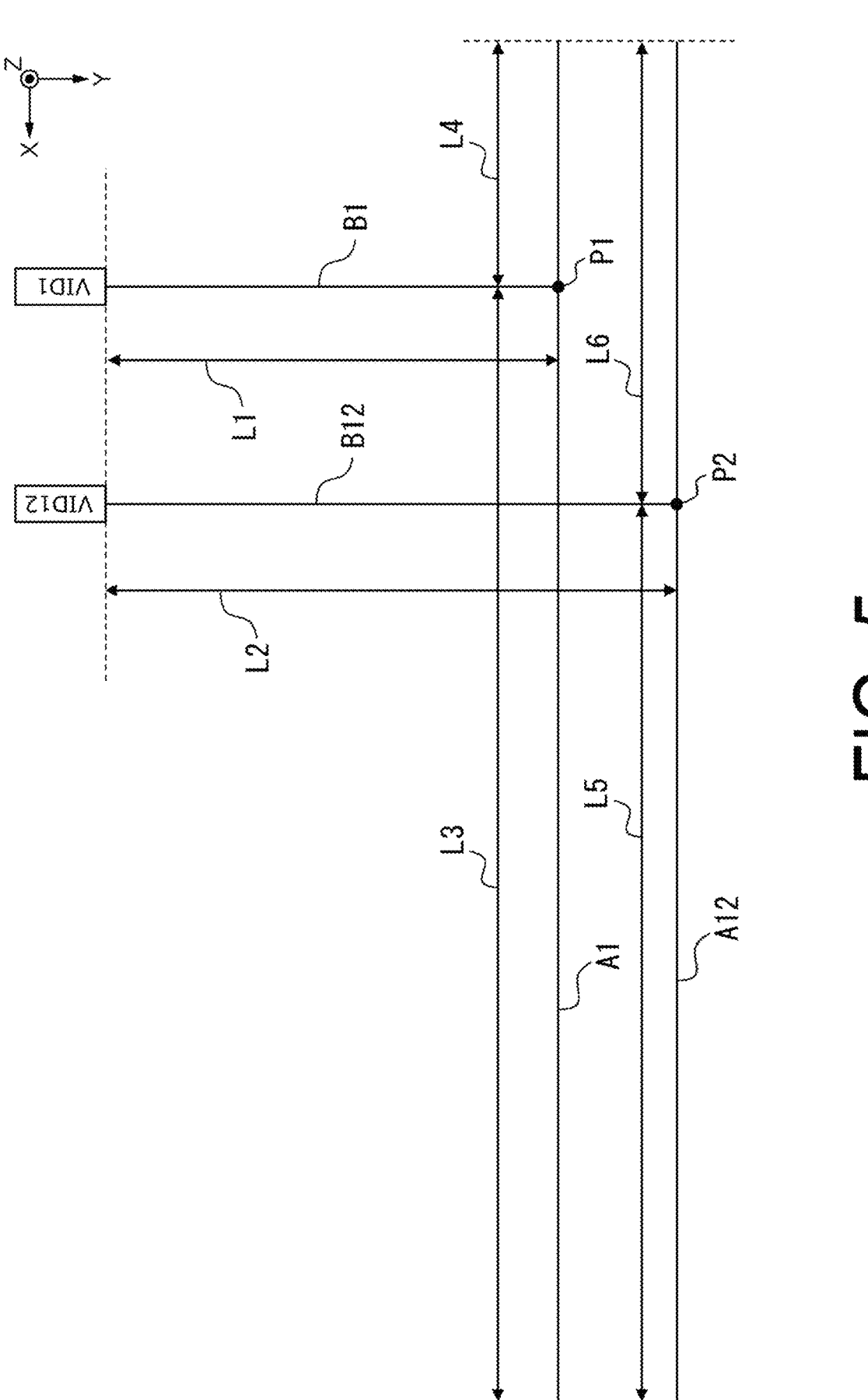
FIG. 5 is a view in which a pair of a video signal line A1 and a pull-in video signal line B1 and a pair of a video signal line A12 and a pull-in video signal line B12 are extracted from FIG. 4.

That is the explanation of the circuit configuration of the element substrate 11. Hereinafter, the relationship between the video signal lines A1 to A12 and the pull-in video signal lines B1 to B12 will be described in more detail with reference to FIG. 5. FIG. 5 is a view in which a pair of the video signal line A1 and the pull-in video signal line B1 and a pair of the video signal line A12 and the pull-in video signal line B12 are extracted from FIG. 4.

In the following description, as an example, among the pull-in video signal lines B1 to B12, the pull-in video signal line B1 having the shortest first wiring length L1 is called a "first pull-in video signal line B1", and the pull-in video signal line B12 having the longest second wiring length L2 is called a "second pull-in video signal line B12". Among the video signal lines A1 to A12, the video signal line A1 electrically coupled to the first pull-in video signal line B1 at a first coupling point P1 is called a "first video signal line A1", and the video signal line A12 electrically coupled to the second pull-in video signal line B12 at a second coupling point P2 is called a "second video signal line A12".

The length from the first coupling point P1 to the left end of the first video signal line A1 is a third wiring length L3. The length from the first coupling point P1 to the right end of the first video signal line A1 is a fourth wiring length L4. The length from the second coupling point P2 to the left end of the second video signal line A12 is a fifth wiring length L5. The length from the second coupling point P2 to the right end of the second video signal line A12 is a sixth wiring length L6. The longest wiring length of the fifth wiring length L5 and the sixth wiring length L6 is shorter than the longest wiring length of the third wiring length L3 and the fourth wiring length L4.

That is, the first pull-in video signal line B1, the second pull-in video signal line B12, the first video signal line A1, and the second video signal line A12 are in a relationship satisfying the following Expressions (13) and (14). In the following Expression (14), MAX (L5:L6) indicates the longest wiring length of the fifth wiring length L5 and the sixth wiring length L6, and MAX (L3:L4) indicates the longest wiring length of the third wiring length L3 and the fourth wiring length L4.

$$L1 < L2 \tag{13}$$

$$\mathrm{MAX}\,(L5{:}L6) < \mathrm{MAX}\,(L3{:}L4) \tag{14}$$

When the fifth wiring length L5 and the sixth wiring length L6 are equal, the left side of the above Expression (14) may be either the fifth wiring length L5 or the sixth wiring length L6. Similarly, when the third wiring length L3 and the fourth wiring length L4 are equal, the right side of the above Expression (14) may be either the third wiring length L3 or the fourth wiring length L4.

Figure 6:
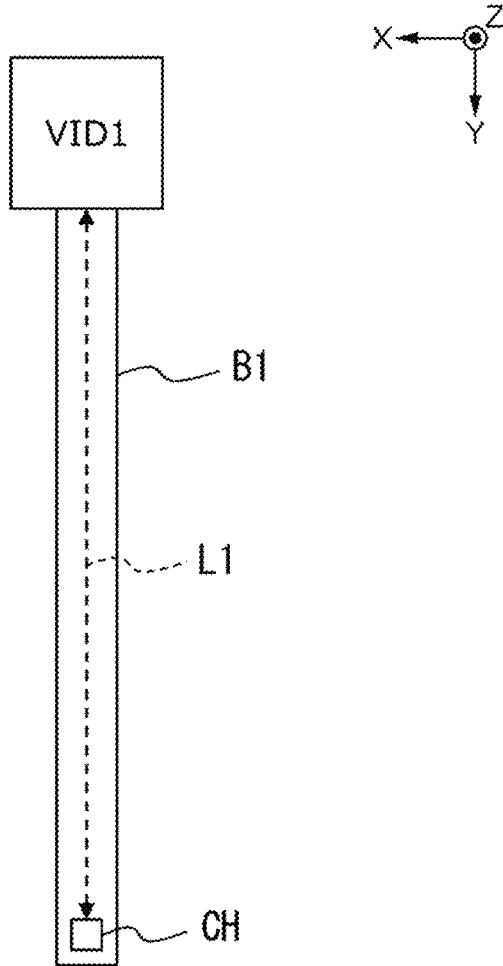
FIG. 6 is a view illustrating a first example of a wiring pattern of a pull-in video signal line.
Figure 7:
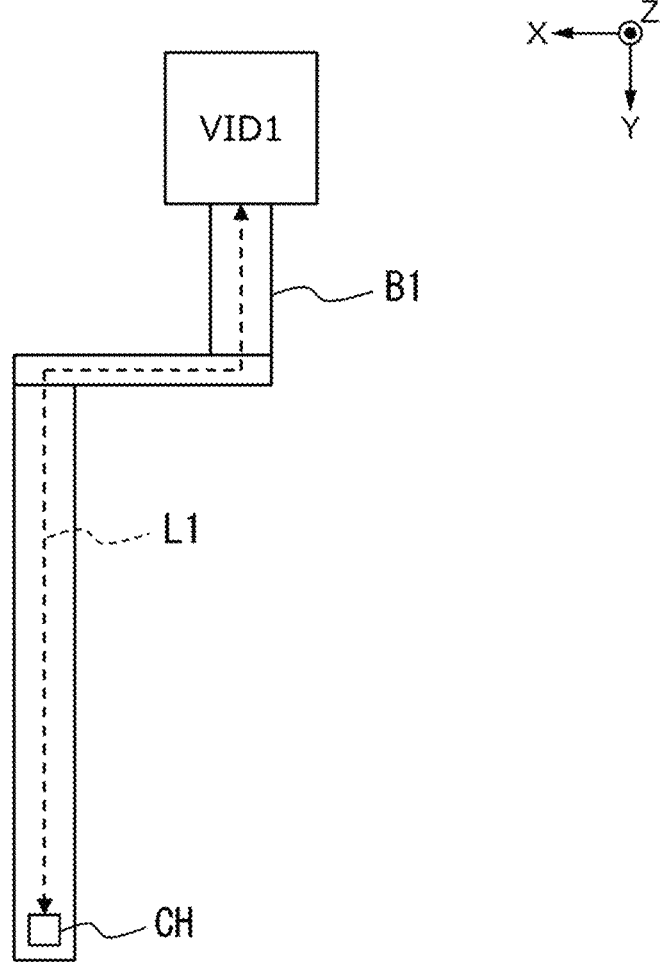
FIG. 7 is a view illustrating a second example of the wiring pattern of the pull-in video signal line.
Figure 8:
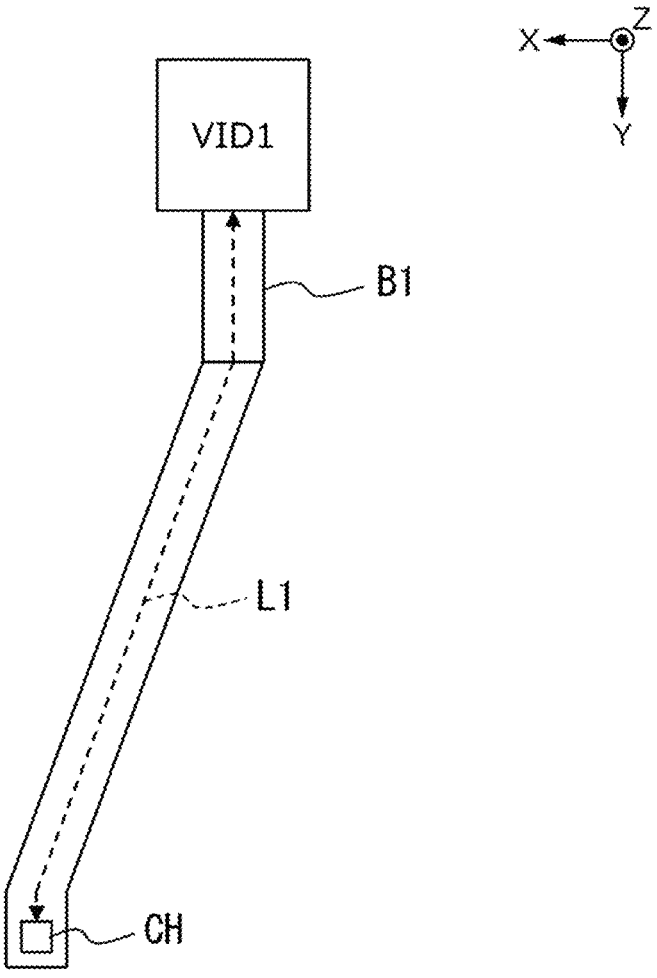
FIG. 8 is a view illustrating a third example of the wiring pattern of the pull-in video signal line.
Figure 9:
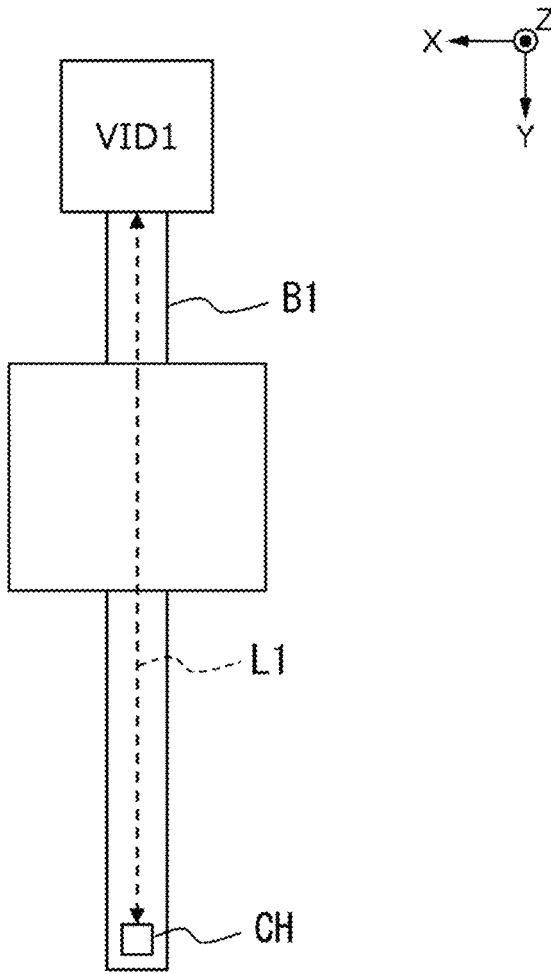
FIG. 9 is a view illustrating a fourth example of the wiring pattern of the pull-in video signal line.

FIGS. 6 to 9 are views illustrating examples of wiring patterns of the first pull-in video signal line B1. FIG. 6 is an example of a wiring pattern of the first pull-in video signal line B1 arranged linearly with a substantially equal width from the VID1 terminal. FIG. 7 is an example of a wiring pattern of the first pull-in video signal line B1 arranged with a substantially equal width from the VID1 terminal through a bent portion. FIG. 8 is an example of a wiring pattern of the first pull-in video signal line B1 arranged with a substantially equal width from the VID1 terminal through an oblique line portion intersecting the Y direction. FIG. 9 is an example of a wiring pattern of the first pull-in video signal line B1 arranged from the VID1 terminal via a widened portion. The widened portion as illustrated in FIG. 9 has a special effect by devising the arrangement, and details will be described later. The pull-in video signal line is not limited to be configured at the same wiring layer, and may pass through different wiring layers. As illustrated in FIGS. 6 to 9, the first wiring length L1 of the first pull-in video signal line B1 is defined as a length of a line segment connecting the VID1 terminal and a contact hole CH in a substantially shortest distance in the wiring pattern of the first pull-in video signal line B1. Therefore, the magnitude of the length of this line segment is substantially the same as the magnitude of the wiring resistance of the first pull-in video signal line B1. The contact hole CH is, for example, an opening formed in an insulating layer arranged between a wiring layer constituting the first pull-in video signal line B1 and a wiring constituting the first video signal line A1. This opening can be processed by etching the insulating layer using a photolithography method. Since the wiring layer constituting the video signal line A1 is exposed in the opening, if the wiring layer constituting the first pull-in video signal line B1 is formed by sputtering, the first pull-in video signal line B1 and the first video signal line A1 come into physical contact with each other and are thus electrically coupled. The contact hole CH is located at the first coupling point P1, and electrically couples the first pull-in video signal line B1 to the first video signal line A1. The definition of the second wiring length L2 of the second pull-in video signal line B12 is the same as the definition of the first wiring length L1.

In the above description, attention is paid to the pair of the video signal line A1 and the pull-in video signal line B1 and the pair of the video signal line A12 and the pull-in video signal line B12. However, as understood from FIGS. 3 and 4, the pair of the video signal line A1 and the pull-in video signal line B1, a pair of an arbitrarily selected video signal line other than the video signal line A1 and a pull-in video signal line electrically coupled to the arbitrarily selected video signal line also have a relationship satisfying the above Expressions (13) and (14).

For example, when the pull-in video signal line B1 having the shortest first wiring length L1 is selected as the "first pull-in video signal line" and the pull-in video signal line B6 is assumed and selected as the "second pull-in video signal line" among the pull-in video signal lines B1 to B12, the video signal line A1 becomes the "first video signal line", and the video signal line A6 becomes the "second video signal line". Also in this case, the first pull-in video signal line B1, the second pull-in video signal line B6, the first video signal line A1, and the second video signal line A6 have a relationship satisfying the above Expressions (13) and (14).

As described above, the liquid crystal panel 10 of the present embodiment has a configuration in which the video signal lines A1 to A12 arranged between the display region E and the data line drive circuit 35 are electrically coupled to the pull-in video signal lines B1 to B12 traversing the data line drive circuit 35 on a one-to-one basis. According to the liquid crystal panel 10 having this configuration, the length of the propagation path of the video signals VID1 to VID12 is shortened as compared with the known technique in which the video signal line group is arranged so as to avoid the data line drive circuit, and therefore a delay of the video signals VID1 to VID12 can be reduced.

The liquid crystal panel 10 of the present embodiment has a configuration in which the pull-in video signal lines B1 and B12 and two video signal lines coupled to those two pull-in video signal lines satisfy the above Expressions (13) and (14). As described below, according to the liquid crystal panel 10 having this configuration, it is possible to reduce the delay regarding a video signal having a large offset amount from the display center line CL regarding the coupling point of the pull-in video signal line and the video signal line as compared with a comparative example described later.

Figure 10:
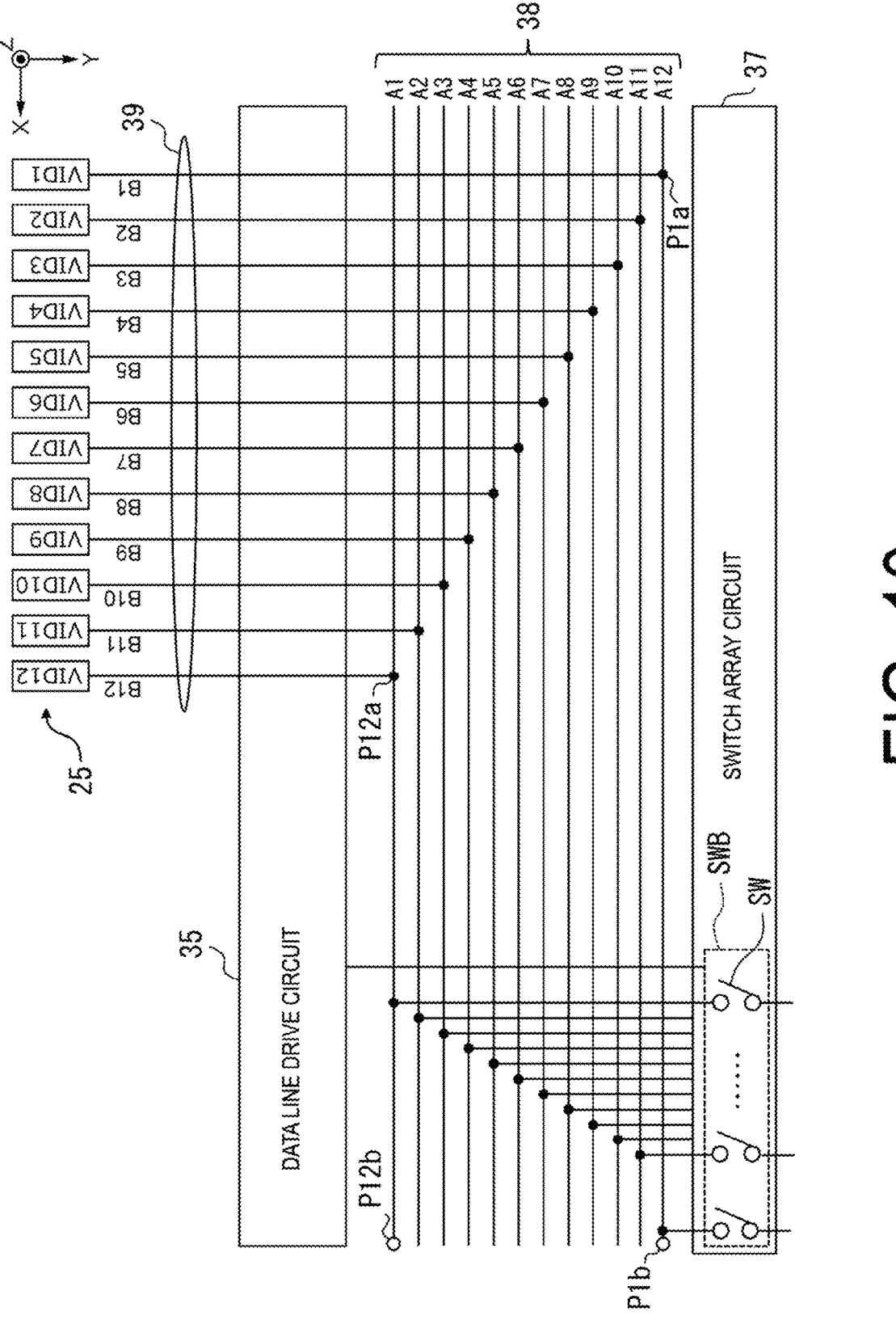
FIG. 10 is a plan view illustrating a wiring layout of a comparative example.

FIG. 10 is a plan view illustrating a wiring layout of the comparative example. Hereinafter, for convenience of description, the wiring layout of the comparative example will be described using the same reference signs as those in FIG. 4. As described with reference to FIG. 4, in the present embodiment, among the video signal lines A1 to A12, the video signal line A1 first from the top, that is, the video signal line A1 closest to the data line drive circuit 35 is electrically coupled to the VID1 terminal via the pull-in video signal line B1.

As described above, the VID1 terminal is the video signal terminal located on the rightmost side among the video signal terminals included in the video signal terminal group 25. In other words, the VID1 terminal is a video signal terminal having the largest offset amount among the video signal terminals located at positions offset rightward from the display center line CL. On the other hand, as illustrated in FIG. 10, in the comparative example, among the video signal lines A1 to A12, the video signal line A12 twelfth from the top, that is, the video signal line A12 farthest from the data line drive circuit 35 is electrically coupled to the VID1 terminal via the pull-in video signal line B1.

As described with reference to FIG. 4, in the present embodiment, among the video signal lines A1 to A12, the video signal line A12 twelfth from the top, that is, the video signal line A12 farthest from the data line drive circuit 35 is electrically coupled to the VID12 terminal via the pull-in video signal line B12. On the other hand, as illustrated in FIG. 10, in the comparative example, among the video signal lines A1 to A12, the video signal line A1 first from the top, that is, the video signal line A1 closest to the data line drive circuit 35 is electrically coupled to the VID12 terminal via the pull-in video signal line B12.

In the present embodiment illustrated in FIG. 4, the point at which the pull-in video signal line B1 extending from the VID1 terminal is electrically coupled to the video signal line A1 is defined as a "coupling point P1$a$", and the point at which the pull-in video signal line B12 extending from the VID12 terminal is electrically coupled to the video signal line A12 is defined as a "coupling point P12$a$". In the present embodiment illustrated in FIG. 4, the left end of the video signal line A1 is an "end point P1$b$", and the left end of the video signal line A12 is an "end point P12$b$".

On the other hand, in the comparative example illustrated in FIG. 10, the point at which the pull-in video signal line B1 extending from the VID1 terminal is electrically coupled to the video signal line A12 is the "coupling point P1$a$", and the point at which the pull-in video signal line B12 extending from the VID12 terminal is electrically coupled to the video signal line A1 is the "coupling point P12$a$". In the comparative example of FIG. 10, the left end of the video signal line A12 is the "end point P1$b$", and the left end of the video signal line A1 is the "end point P12$b$".

Figure 11:
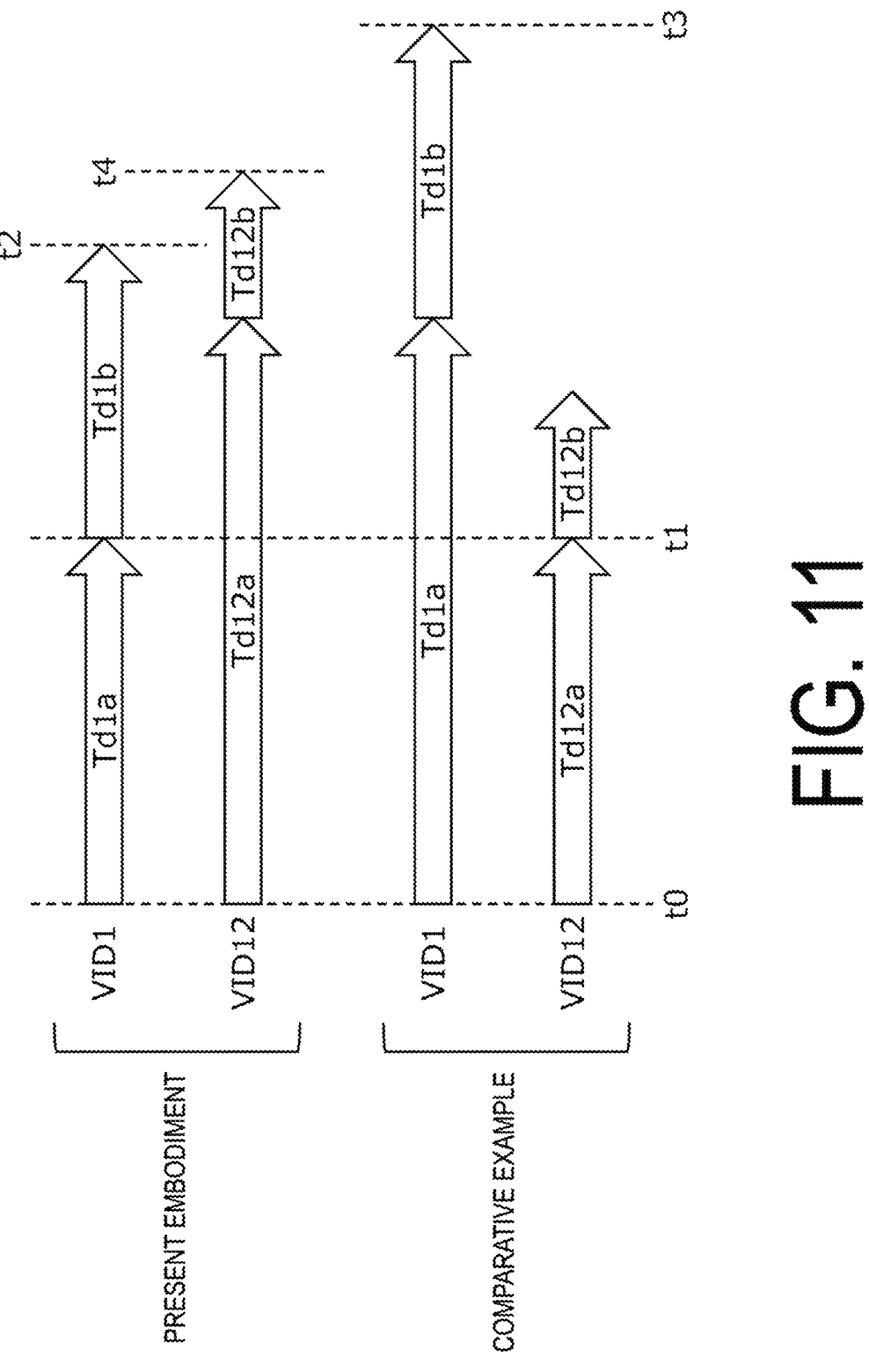
FIG. 11 is a view schematically illustrating a delay time of a video signal in the present embodiment and a delay time of a video signal in a comparative example.

Here, an outline of a difference in signal delay between the present embodiment illustrated in FIG. 4 and the comparative example illustrated in FIG. 10 will be described. FIG. 11 is a view schematically illustrating delay times of the video signals VID1 and VID12 in the present embodiment and delay times of the video signals VID1 and VID12 in the comparative example. As illustrated in FIG. 11, in both the present embodiment and the comparative example, the delay time of the video signal VID1 at the coupling point P1$a$ with the VID1 terminal as a reference is a "Td1$a$". In both the present embodiment and the comparative example, the delay time of the video signal VID12 at the coupling point P12$a$ with the VID12 terminal as a reference is a "Td12$a$".

Here, the pull-in video signal lines B1 and B12 are treated as having extremely small parasitic capacitances, and wiring resistances are mainly considered. At each of the coupling points P1$a$ and P12$a$, a time constant due to this wiring resistance and parasitic capacitances of the video signal lines A1 and A12 extending along the X axis is seen.

Assuming that the parasitic capacitances of the video signal lines A1 and A12 are close to each other, the delay time Td1$a$ of the video signal VID1 is shorter than the delay time Td12$a$ of the video signal VID12 in the present embodiment due to the wiring resistance difference caused by the wiring length difference between the pull-in video signal lines B1 and B12. On the other hand, in the comparative example, the magnitude relationship is reversed, and the delay time Td1$a$ of the video signal VID1 is longer than the delay time Td12$a$ of the video signal VID12.

Note that both the present embodiment and the comparative example assume that the video signal VID1 is ideally input to the VID1 terminal and the video signal VID12 is ideally input to the VID12 terminal at time t0 illustrated in FIG. 11. The delay time Td1$a$ of the video signal VID1 in the present embodiment and the delay time Td12$a$ of the video signal VID12 in the comparative example are substantially equal to each other, and correspond to the period of time from time t0 to time t1.

Subsequently, as illustrated in FIG. 11, in both the present embodiment and the comparative example, the delay time of the video signal VID1 at the end point P1$b$ when using the coupling point P1$a$ as a reference is "Td1$b$". In both the present embodiment and the comparative example, the delay time of the video signal VID12 at the end point P12$b$ when using the coupling point P12$a$ as a reference is "Td12$b$".

The video signal lines A1 and A12 extending along the X axis may assume that the parasitic capacitance and the wiring resistance are substantially evenly distributed. Therefore, when the coupling point P1$a$ is used as a reference, the largest delay of the video signal VID1 occurs at the end point P1$b$. Similarly, when the coupling point P12$a$ is used as a reference, the largest delay of the video signal VID12 occurs at the end point P12$b$. Therefore, focusing on the delay at the end point P1$b$ farthest from the coupling point P1$a$ and the end point P12$b$ farthest from the coupling point P12$a$, an outline of the delay of the video signal can be considered.

In the present embodiment, the distance between the coupling point P1$a$ and the end point P1$b$ is longer than the distance between the coupling point P12$a$ and the end point P12$b$. Therefore, in the present embodiment, the delay time Td1$b$ of the video signal VID1 is greater than the delay time Td12$b$ of the video signal VID12. Also in the comparative example, similarly, the distance between the coupling point P1$a$ and the end point P1$b$ is longer than the distance between the coupling point P12$a$ and the end point P12$b$, and therefore the delay time Td1$b$ of the video signal VID1 is greater than the delay time Td12$b$ of the video signal VID12.

In the present embodiment, the delay of the video signal VID1 at the end point P1$b$ is time t2 with the VID1 terminal as a reference. On the other hand, in the comparative example, the delay of the video signal VID1 at the end point P1$b$ is time t3 with the VID1 terminal as a reference. Thus, according to the liquid crystal panel 10 of the present embodiment, as compared with the comparative example illustrated in FIG. 10, it is possible to reduce the delay of the video signal VID1 to be input to the VID1 terminal having the largest offset amount among the video signal terminals located at the positions offset to the right from the display center line CL. In the present embodiment, the signal delay is smallest near the coupling point P1$a$, and the signal delay corresponds to time t1. Conversely, the signal delay is largest near the end point P12$b$, and the signal delay corresponds to time t4. Therefore, the signal delays of the video signals VID1 to VID12 are distributed from time t1 to time t4 overall. On the other hand, in the comparative example, the signal delay is smallest near the coupling point P12$a$, and the signal delay corresponds to time t1. Conversely, the signal delay is largest near the end point P1$b$, and the signal delay corresponds to time t3. Therefore, the signal delays of the video signals VID1 to VID12 are distributed from time t1 to time t3 overall. Therefore, according to the present embodiment, since the timings of the video signals are aligned, it is suitable for high-speed drive.

Effects of Present Embodiment

As described above, the liquid crystal panel 10 of the present embodiment includes the plurality of scanning lines 31 extending along the X axis, the plurality of data lines 32 extending along the Y axis intersecting the X axis, the pixel P arranged corresponding to each position where the plurality of scanning lines 31 and the plurality of data lines 32 intersect in the display region E, the data line drive circuit 35 arranged at a position apart upward from the display region E, the twelve video signal lines A1 to A12 arranged between the display region E and the data line drive circuit 35 and extending along the X axis, and the twelve pull-in video signal lines B1 to B12 extending along the Y axis and electrically coupled to the twelve video signal lines A1 to A12 on a one-to-one basis. In plan view, the pull-in video signal lines B1 to B12 traverse the data line drive circuit 35.

The pull-in video signal lines B1 to B12 include the first pull-in video signal line B1 having the shortest first wiring length L1 and the second pull-in video signal line B12 having the longest second wiring length L2.

The video signal lines A1 to A12 include the first video signal line A1 electrically coupled to the first pull-in video signal line B1 at the first coupling point P1, and the second video signal line A12 electrically coupled to the second pull-in video signal line B12 at the second coupling point P2. The length from the first coupling point P1 to the left end of the first video signal line A1 is the third wiring length L3. The length from the first coupling point P1 to the right end of the first video signal line A1 is the fourth wiring length L4. The length from the second coupling point P2 to the left end of the second video signal line A12 is the fifth wiring length L5.

The length from the second coupling point P2 to the right end of the second video signal line A12 is the sixth wiring length L6.

The longest wiring length of the fifth wiring length L5 and the sixth wiring length L6 is shorter than the longest wiring length of the third wiring length L3 and the fourth wiring length L4.

According to the liquid crystal panel 10 of the present embodiment as described above, since the length of the propagation path of the video signals VID1 to VID12 is shortened as compared with the known technique in which the video signal line group is arranged so as to avoid the data line drive circuit, the delay of the video signals VID1 to VID12 can be reduced. According to the liquid crystal panel 10 of the present embodiment, as compared with the comparative example illustrated in FIG. 10, it is possible to reduce the delay of the video signal VID1 to be input to the VID1 terminal having the largest offset amount among the video signal terminals located at the positions offset to the right from the display center line CL. The delay difference from the video signals VID1 to VID12 can be reduced. As a result, high-speed drive of the liquid crystal panel 10 can be achieved.

2. Electronic Equipment

Figure 12:
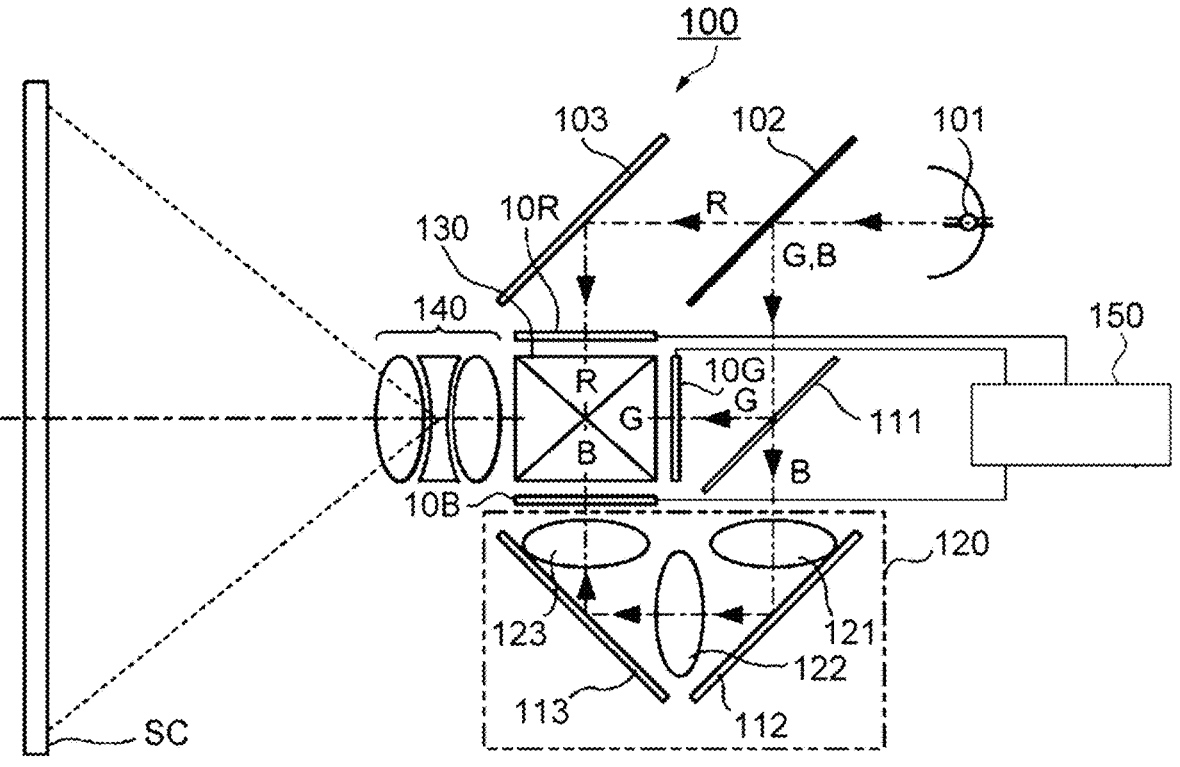
FIG. 12 is an explanatory diagram illustrating a schematic configuration of a projector.

FIG. 12 is a schematic configuration diagram illustrating the configuration of a projector 100 as electronic equipment according to the present embodiment. Hereinafter, the projector 100 will be described as an example of electronic equipment including the liquid crystal panel 10 of the present embodiment.

The projector 100 is a three-plate projector, and includes a lamp unit 101 as a light source, dichroic mirrors 102 and 103 as a color separation optical system, a liquid crystal panel 10B corresponding to blue light B, a liquid crystal panel 10G corresponding to green light G, a liquid crystal panel 10R corresponding to red light R, three reflection mirrors 111, 112, and 113, three relay lenses 121, 122, and 123, a dichroic prism 130 as a color synthesis optical system, and a projection lens 140 as a projection optical system. A video is projected onto a screen SC by the projection optical system. The relay lenses 121, 122, and 123 and the reflection mirrors 112 and 113 constitute a relay lens system 120. The projector 100 also includes a control device 150 that controls the liquid crystal panels 10B, 10G, and 10R.

3. Modifications

Although the embodiment of the present disclosure has been described above, the technical scope of the present disclosure is not limited to the above embodiment, and various changes can be made without departing from the gist of the present disclosure. For example, the following modifications are conceivable.

Figure 13:
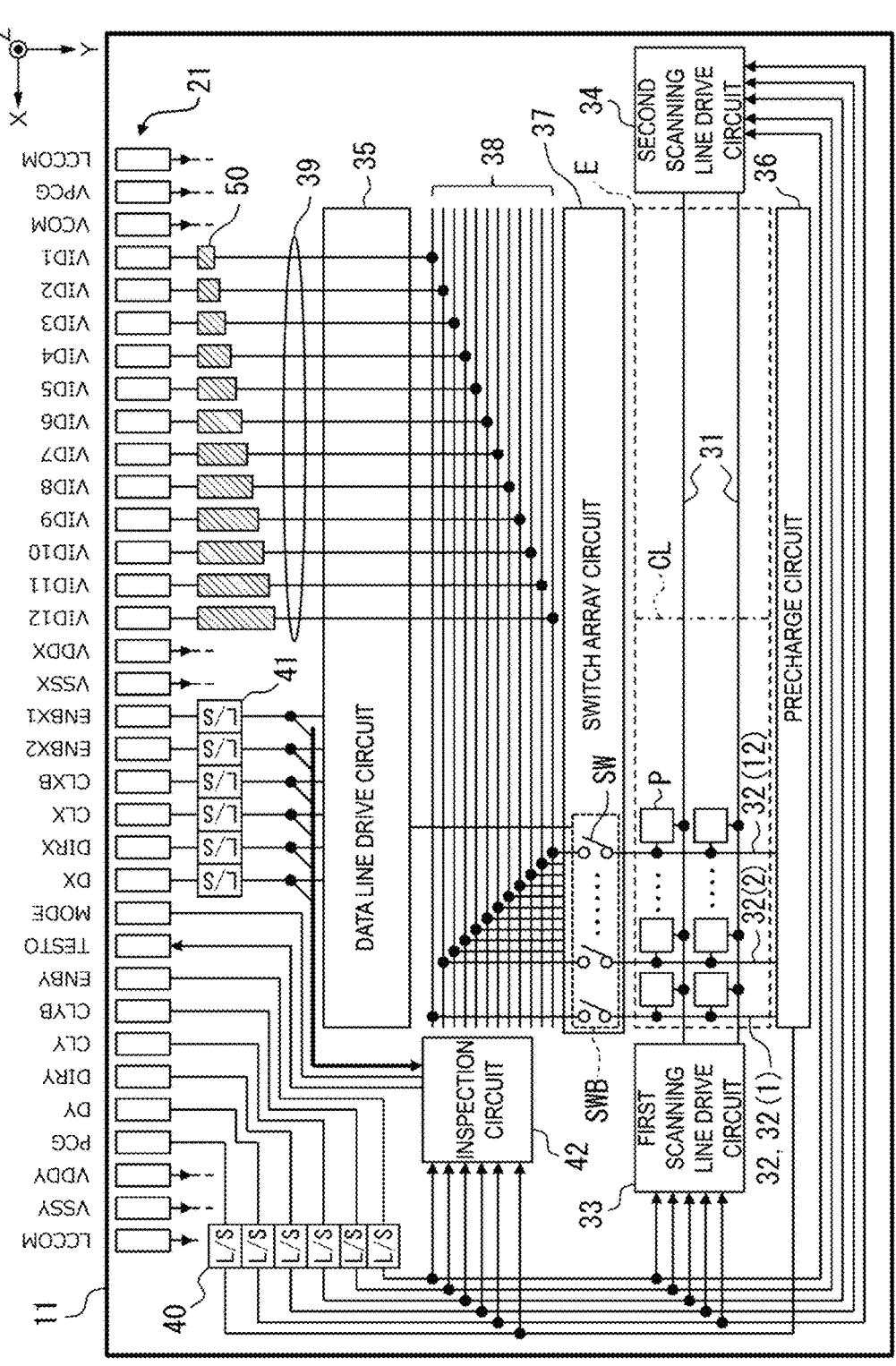
FIG. 13 is a view illustrating a first modification of the liquid crystal panel.

(1) Referring to FIG. 11, it can be expected that reducing the difference between the signal delay Td1$a$ at the first coupling point and the signal delay Td12$a$ at the second coupling point is also effective in reducing the delay difference from the video signals VID1 to VID12. FIG. 13 is a view illustrating the first modification of the liquid crystal panel 10. As illustrated in FIG. 13, each of the pull-in video signal lines B1 to B12 may include a widened portion 50. The widened portion 50 is a portion having a larger width than other portions in the wiring pattern of each of the pull-in video signal lines B1 to B12. For example, each widened portion 50 has a rectangular shape.

The widths of all the widened portions 50 are the same. Among the twelve widened portions 50, the widened portion 50 located on the leftmost side, that is, the widened portion 50 of the pull-in video signal line B12 has the longest length. The length of the widened portion 50 gradually increases from the pull-in video signal line B1 toward the pull-in video signal line B12.

For example, among the pull-in video signal lines B1 to B12, the pull-in video signal line B1 having the shortest first wiring length L1 is the "first pull-in video signal line", and the pull-in video signal line B12 having the longest second wiring length L2 is the "second pull-in video signal line". The widened portion 50 of the first pull-in video signal line B1 is the "first widened portion 50(1)", and the widened portion 50 of the second pull-in video signal line B12 is the "second widened portion 50(12)".

That is, in the first modification, the first pull-in video signal line B1 includes the first widened portion 50(1), and the second pull-in video signal line B12 includes the second widened portion 50(12). The width of the first widened portion 50(1) is the same as the width of the second widened portion 50(12). The length of the first widened portion 50(1) is shorter than the length of the second widened portion 50(12). Therefore, a wiring resistance difference occurs due to a difference in length of the widened portions 50.

According to the first modification as described above, the wiring resistances of the pull-in video signal lines B1 to B12 decrease from the pull-in video signal line B1 toward the pull-in video signal line B12. As a result, the delay time Td12a of the video signal VID12 at the coupling point P12a with the VID12 terminal as a reference is shortened. As illustrated in FIG. 11, when the delay time Td12a of the video signal VID12 is shortened, the delay difference from the video signals VID1 to VID12 can be reduced, and therefore further higher-speed drive of the liquid crystal panel 10 can be achieved.

As illustrated in FIG. 13, all the widened portions 50 including the first widened portion 50(1) and the second widened portion 50(12) may be arranged at positions not overlapping the data line drive circuit 35 in plan view. More specifically, all the widened portions 50 including the first widened portion 50(1) and the second widened portion 50(12) may be arranged between the data line drive circuit 35 and the video signal terminal group 25. In other words, the position overlapping the data line drive circuit 35 is a portion overlapping, for example, a drive signal line or a drive potential line supplied to the data line drive circuit 35 or the transistor constituting the data line drive circuit 35 in plan view, and the widened portion 50 may be arranged while avoiding these portions. This can avoid generation of unnecessary parasitic capacitance between all the widened portions 50 and various wirings constituting the data line drive circuit 35.

Figure 14:
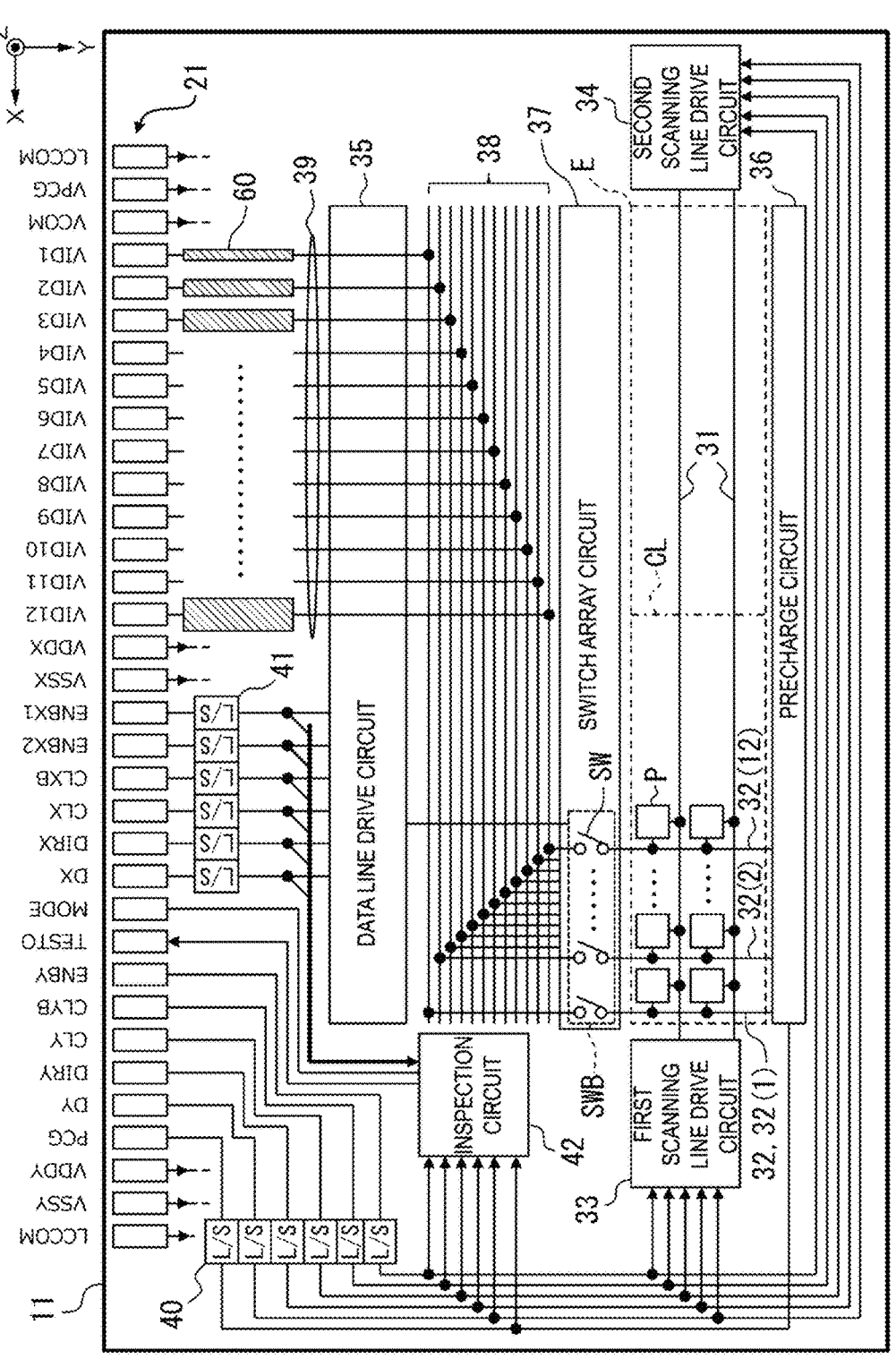
FIG. 14 is a view illustrating a second modification of the liquid crystal panel.

(2) FIG. 14 is a view illustrating the second modification of the liquid crystal panel 10. As illustrated in FIG. 14, each of the pull-in video signal lines B1 to B12 may include a widened portion 60. The widened portion 60 is a portion having a larger width than other portions in the wiring pattern of each of the pull-in video signal lines B1 to B12. For example, each widened portion 60 has a rectangular shape.

The lengths of all the widened portions 60 are the same. Among the twelve widened portions 60, the widened portion 60 located on the rightmost side, that is, the widened portion 60 of the pull-in video signal line B1 has the smallest width. The width of the widened portion 60 gradually increases from the pull-in video signal line B1 toward the pull-in video signal line B12.

For example, similarly to the first modification, the widened portion 60 of the first pull-in video signal line B1 is the "first widened portion 60(1)", and the widened portion 60 of the second pull-in video signal line B12 is the "second widened portion 60(12)". That is, in the second modification, the first pull-in video signal line B1 includes the first widened portion 60(1), and the second pull-in video signal line B12 includes the second widened portion 60(12).

The length of the first widened portion 60(1) is the same as the length of the second widened portion 60(12). The width of the first widened portion 60(1) is smaller than the width of the second widened portion 60(12).

According to the second modification as described above, the wiring resistances of the pull-in video signal lines B1 to B12 decrease from the pull-in video signal line B1 toward the pull-in video signal line B12. As a result, the delay time Td12a of the video signal VID12 at the coupling point P12a with the VID12 terminal as a reference is shortened. As illustrated in FIG. 11, since when the delay time Td12a of the video signal VID12 is shortened, the delay difference from the video signals VID1 to VID12 is reduced, further higher-speed drive of the liquid crystal panel 10 can be achieved.

Similarly to the first modification, as illustrated in FIG. 14, all the widened portions 60 including the first widened portion 60(1) and the second widened portion 60(12) may be arranged at positions not overlapping the data line drive circuit 35 in plan view. More specifically, all the widened portions 60 including the first widened portion 60(1) and the second widened portion 60(12) may be arranged between the data line drive circuit 35 and the video signal terminal group 25.

(3) In the above embodiment, the liquid crystal panel 10 driven by the phase development drive system of 12 phases is exemplified, but the present disclosure can be applied also to a liquid crystal panel driven by a phase development drive system of other than 12 phases. The numbers of the video signal lines, the pull-in video signal lines, and the video signal terminals may be appropriately changed in accordance with the number of phases.

(4) In the configurations described in the first modification and the second modification, the wiring resistance of the pull-in video signal line is adjusted, but the wiring resistance can be adjusted by a configuration other than the configurations described in the first modification and the second modification. For example, a wiring resistor winding in a zigzag shape may be provided without using the widened portion 50 or the widened portion 60. In this case, the extension of winding becomes longer from the pull-in video signal line B1 toward the pull-in video signal line B12. Provision of a resistance adjustment unit for each pull-in video signal line is not forced. For example, the same resistance value adjustment 1 may be performed on the pull-in video signal lines B1 and B2, and the same resistance value adjustment 2 may be performed on the pull-in video signal lines B3 and B4.

Figure 15:
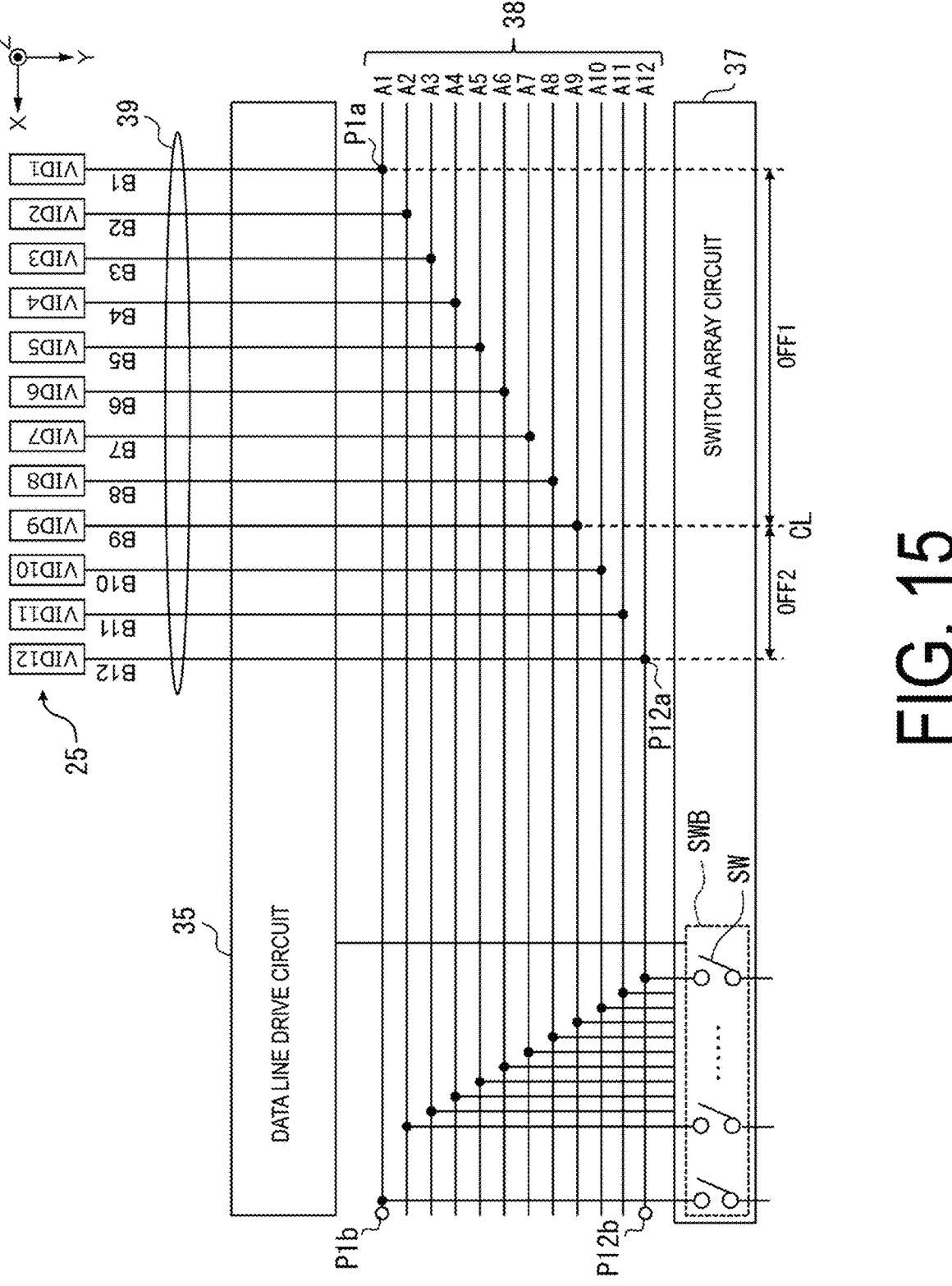
FIG. 15 is a view illustrating a third modification of the liquid crystal panel.

(5) In the above embodiment, the VID12 terminal of the video signal terminal group 25 is present near on the display center line CL for the sake of description, but the present disclosure is not limited to this, and some terminals of the VID1 terminal to the VID12 terminal may be offset to the left side relative to the display center line CL, and some other terminals may be offset to the right side relative to the display center line CL. For example, as illustrated in FIG. 15, the VID9 terminal may be present near on the display center line CL. Even in this case, the present disclosure can be applied in a range where Expressions (13) and (14) are satisfied, and for example, when the VID9 terminal is present near on the display center line CL, the farthest point P1b of the video signal line A1 with the coupling point P1a as a reference is on the +X direction side in FIG. 15. On the other hand, it may be considered that the farthest point P12b of the video signal line A12 with the coupling point P12a as a reference is on the −X direction side. Even in this case, the configuration satisfying Expressions (13) and (14) is possible. At that time, where the absolute value of the offset amount from the display center line CL of the coupling point P1a is OFF1 and the absolute value of the offset amount from the display center line CL of the coupling point P12a is OFF2, OFF1 is larger than OFF2. If the respective pull-in video signal lines B1 to B12 are arranged substantially linearly from the VID terminals 1 to 12 and electrically coupled to the respective video signal lines A1 to A12, the absolute value of the offset amount from the display center line CL of the VID terminal 1 is larger than the absolute value of the offset amount from the display center line CL of the VID terminal 12.

(6) In the above embodiment, the liquid crystal panel 10 is exemplified as the electro-optical device of the present disclosure, but the present disclosure can be applied also to other electro-optical devices such as an organic electro luminescence diode (OLED) panel. The element substrate 11 and the counter substrate 12 are not limited to glass substrates, and can be applied also to other electro-optical devices including plastic substrates.

(7) In the above embodiment, the projector 100 is exemplified as the electronic equipment including the liquid crystal panel 10, but the electronic equipment of the present disclosure is not limited to this. For example, the electronic equipment of the present disclosure may be a 3D printer that cures a resin liquid using light emitted from an electro-optical device such as the liquid crystal panel 10, a head-up display (HUD), a head mounted display (HMD), a monitor for a personal computer, a digital camera, a television, or the like.

CONCLUSIONS OF PRESENT DISCLOSURE

Hereinafter, conclusions of the present disclosure with be described.

Supplementary Note 1

An electro-optical device includes a plurality of scanning lines extending along a first direction, a plurality of data lines extending along a second direction intersecting the first direction, a pixel arranged corresponding to each position where the plurality of scanning lines and the plurality of data lines intersect with each other in a display region, a data line drive circuit arranged at a position away from the display region on one end side in the second direction, a plurality of video signal lines arranged between the display region and the data line drive circuit and extending along the first direction, and a plurality of pull-in video signal lines extending along the second direction and electrically coupled to the plurality of video signal lines on a one-to-one basis, in which in plan view, the plurality of pull-in video signal lines traverse the data line drive circuit, and the plurality of pull-in video signal lines include a first pull-in video signal line having a shortest first wiring length and a second pull-in video signal line having a longest second wiring length, the plurality of video signal lines include a first video signal line electrically coupled to the first pull-in video signal line at a first coupling point and a second video signal line electrically coupled to the second pull-in video signal line at a second coupling point, a length from the first coupling point to one end of the first video signal line is a third wiring length, a length from the first coupling point to the other end of the first video signal line is a fourth wiring length, a length from the second coupling point to one end of the second video signal line is a fifth wiring length, a length from the second coupling point to the other end of the second video signal line is a sixth wiring length, and a longest wiring length of the fifth wiring length and the sixth wiring length is shorter than a longest wiring length of the third wiring length and the fourth wiring length.

The electro-optical device according to Supplementary Note 1 has a configuration in which the plurality of video signal lines arranged between the display region and the data line drive circuit are electrically coupled on a one-to-one basis to the plurality of pull-in video signal lines traversing the data line drive circuit. According to the electro-optical device having such a configuration, since the length of the propagation path of the video signal is shortened as compared with the known technique in which the video signal line group is arranged so as to avoid the data line drive circuit, the delay of the video signal can be reduced. According to the electro-optical device according to Supplementary Note 1, as compared with the comparative example illustrated in FIG. 10, it is possible to reduce the delay of the video signal propagated through the pull-in video signal line present at the farthest position from the display center line. As a result, high-speed drive of the electro-optical device can be achieved.

Supplementary Note 2

The electro-optical device according to Supplementary Note 1, in which the first pull-in video signal line includes a first widened portion, the second pull-in video signal line includes a second widened portion, a width of the first widened portion is same as a width of the second widened portion, and a length of the first widened portion is shorter than a length of the second widened portion.

According to the electro-optical device according to Supplementary Note 2, since the wiring resistance of the second pull-in video signal line having the longest second wiring length is reduced, the signal delay at the second coupling point can be reduced. As a result, further high-speed drive of the electro-optical device can be achieved.

Supplementary Note 3

The electro-optical device according to Supplementary Note 1, in which the first pull-in video signal line includes a first widened portion, the second pull-in video signal line includes a second widened portion, a length of the first widened portion is same as a length of the second widened portion, and a width of the first widened portion is smaller than a width of the second widened portion.

According to the electro-optical device according to Supplementary Note 3, since the wiring resistance of the second pull-in video signal line having the longest second wiring length is reduced, the signal delay at the second coupling point can be reduced. As a result, further high-speed drive of the electro-optical device can be achieved.

Supplementary Note 4

The electro-optical device according to Supplementary Note 2 or 3, in which the first widened portion and the second widened portion are arranged at positions not overlapping the data line drive circuit in plan view.

According to the electro-optical device according to Supplementary Note 4, since the first widened portion and the second widened portion are arranged at positions not overlapping the data line drive circuit in plan view, it is possible to avoid generation of parasitic capacitance between each of the first widened portion and the second widened portion and various wirings constituting the data line drive circuit. Therefore, an increase in an unnecessary signal delay at the coupling point between each of the pull-in video signal lines and the video signal line is suppressed.

Supplementary Note 5

An electronic equipment including the electro-optical device according to any one of Supplementary Notes 1 to 4.

What is claimed is:

1. An electro-optical device, comprising:
a plurality of scanning lines extending along a first direction;
a plurality of data lines extending along a second direction intersecting the first direction;
a pixel arranged corresponding to each position where the plurality of scanning lines and the plurality of data lines intersect with each other in a display region;
a data line drive circuit arranged at a position away from the display region on one end side in the second direction;
a plurality of video signal lines arranged between the display region and the data line drive circuit and extending along the first direction; and
a plurality of pull-in video signal lines extending along the second direction and electrically coupled to the plurality of video signal lines on a one-to-one basis, wherein
in a plan view, the plurality of pull-in video signal lines traverse the data line drive circuit, and the plurality of pull-in video signal lines include a first pull-in video signal line having a shortest first wiring length and a second pull-in video signal line having a longest second wiring length,
the plurality of video signal lines include a first video signal line electrically coupled to the first pull-in video signal line at a first coupling point and a second video signal line electrically coupled to the second pull-in video signal line at a second coupling point, a length from the first coupling point to one end of the first video signal line is a third wiring length,
a length from the first coupling point to an other end of the first video signal line is a fourth wiring length,
a length from the second coupling point to one end of the second video signal line is a fifth wiring length,
a length from the second coupling point to an other end of the second video signal line is a sixth wiring length, and
a longest wiring length of the fifth wiring length and the sixth wiring length is shorter than a longest wiring length of the third wiring length and the fourth wiring length.

2. The electro-optical device according to claim 1, wherein
the first pull-in video signal line includes a first widened portion,
the second pull-in video signal line includes a second widened portion,
a width of the first widened portion is identical to a width of the second widened portion, and
a length of the first widened portion is shorter than a length of the second widened portion.

3. The electro-optical device according to claim 2, wherein the first widened portion and the second widened portion are arranged at positions not overlapping the data line drive circuit in the plan view.

4. The electro-optical device according to claim 1, wherein
the first pull-in video signal line includes a first widened portion,
the second pull-in video signal line includes a second widened portion,
a length of the first widened portion is identical to a length of the second widened portion, and
a width of the first widened portion is smaller than a width of the second widened portion.

5. An electronic equipment comprising the electro-optical device according to claim 1.

*   *   *   *   *